(12) United States Patent
Li et al.

(10) Patent No.: US 12,088,501 B2
(45) Date of Patent: Sep. 10, 2024

(54) SYSTEMS AND METHODS FOR SUPPORTING TRAFFIC STEERING THROUGH A SERVICE FUNCTION CHAIN

(71) Applicant: HUAWEI TECHNOLOGIES CO., LTD., Shenzhen (CN)

(72) Inventors: Xu Li, Nepean (CA); Chengchao Liang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/140,431

(22) Filed: Apr. 27, 2023

(65) Prior Publication Data
US 2023/0370383 A1  Nov. 16, 2023

Related U.S. Application Data

(63) Continuation of application No. 17/552,006, filed on Dec. 15, 2021, now Pat. No. 11,671,373, which is a
(Continued)

(51) Int. Cl.
*G06F 15/173* (2006.01)
*H04L 12/14* (2006.01)
(Continued)

(52) U.S. Cl.
CPC .......... *H04L 47/20* (2013.01); *H04L 12/1407* (2013.01); *H04L 47/22* (2013.01); *H04L 61/4511* (2022.05); *H04L 61/58* (2022.05)

(58) Field of Classification Search
CPC ......... H04L 47/20; H04L 47/22; H04L 61/58; H04L 61/4511; H04L 12/1407
See application file for complete search history.

(56) References Cited

U.S. PATENT DOCUMENTS

2017/0118311 A1   4/2017  Frydman et al.
2017/0257275 A1   9/2017  Atyam et al.
(Continued)

FOREIGN PATENT DOCUMENTS

CN   101616404 A   12/2009
CN   101860932 A   10/2010
(Continued)

OTHER PUBLICATIONS

ETSI GR MEC 018 V1.1.1 (Oct. 2017), Mobile Edge Computing (MEC); End to End Mobility Aspects. 52 pages.
(Continued)

*Primary Examiner* — Joseph R Maniwang

(57) ABSTRACT

Methods and system for supporting traffic steering through a service function chain, the service function chain comprising at least one data processing function. An aspect of the disclosure provides for a method for steering traffic of a packet data unit (PDU) performed by a session management function. The method includes receiving PCC rules from a policy control function, the PCC rules including information comprising at least one of service function chain information; final delivery indication; and selective traffic steering information and associated parameters. The method further includes configuring at least one user plane function (UPF) according to the information. In some embodiments the configuring the at least one UPF includes instructing a first UPF to detect traffic according to the packet detection rules and route the received packet according to the forwarding action rules.

34 Claims, 10 Drawing Sheets

Related U.S. Application Data continuation of application No. PCT/CN2019/126550, filed on Dec. 19, 2019.

(60) Provisional application No. 62/881,256, filed on Jul. 31, 2019.

(51) Int. Cl.
  H04L 47/20 (2022.01)
  H04L 47/22 (2022.01)
  H04L 61/4511 (2022.01)
  H04L 61/58 (2022.01)

(56) References Cited

U.S. PATENT DOCUMENTS

| | | | |
|---|---|---|---|
| 2019/0098536 A1 | 3/2019 | Qiao et al. | |
| 2022/0247688 A1* | 8/2022 | Puente Pestaña ... | H04L 45/0377 |
| 2023/0232272 A1* | 7/2023 | Puente Pestaña ... | H04L 41/5025 370/252 |

FOREIGN PATENT DOCUMENTS

| | | |
|---|---|---|
| CN | 103152396 A | 6/2013 |
| CN | 106790139 A | 5/2017 |
| CN | 107018534 A | 8/2017 |
| CN | 107172666 A | 9/2017 |
| CN | 107305502 A | 10/2017 |
| CN | 109729181 A | 5/2019 |
| CN | 109788078 A | 5/2019 |
| EP | 2670195 A1 | 12/2013 |
| WO | 2017100640 A1 | 6/2017 |
| WO | 2017129742 A1 | 8/2017 |
| WO | 2017222625 A1 | 12/2017 |
| WO | 2018145669 A1 | 8/2018 |
| WO | 2018199649 A1 | 11/2018 |
| WO | 2019035406 A1 | 2/2019 |

OTHER PUBLICATIONS

3GPP TS 23.501 V16.1.0 (Jun. 2018), 3rd Generation Partnership Project; Technical Specification Group Services and System Aspects; System Architecture for the 5G System;Stage 2(Release 16), 367 pages.

ETSI GS MEC 011 V1.1.1 (Jul. 2017), Mobile Edge Computing(MEC); Mobile Edge Platform Application Enablement. 55 pages.

3GPP TS 23.502 V16.1.1 (Jun. 2019), 3rd Generation Partnership Project; Technical Specification Group Services and System Aspects; Procedures for the 5G System; Stage 2(Release 16), 494 pages.

Hua Wei et al. Clarification and correction to AF response, S2-1908354, 3GPP TSG-WG SA2 Meeting #134, Jun. 28, 2019 (Jun. 28, 2019), total 9 pages.

Ericsson et al. Correct condition for DNAI in UP path change,C3-192077, 3GPP TSG-CT WG3 Meeting #103, May 17, 2019 (May 17, 2019), total 5 pages.

Nokia, Alcatel-Lucent Shanghai Bell, 23.502 4.3.5: Application influence on UP control. 3GPP TSG SA WG2 Meeting #119, Feb. 13-Feb. 17, 2017, Dubrovnik, Croatia, S2-171788, 4 pages.

3GPP TSG-CT WG3 Meeting #98Bis, C3-186083, GPSI and N6 info in AF influence subscription, Ericsson, Vilnius, Lithuania, Oct. 15-19, 2018,total 21 pages.

3GPP TSG SA WG2 Meeting #119,S2-171788,23.502 4.3.5: Application influence on UP control, Nokia, Alcatel-Lucent Shanghai Bell, Feb. 13-Feb. 17, 2017, Dubrovnik, Croatia,total 4 pages.

SA WG2 Meeting #124, S2-178611,Addition of Maximum Packet Loss Rate in PCC rule,Huawei, China Telecom, China Unicom, CATT, China Mobile ,Qualcomm Incorporated, ZTE, CATR, Telecom Italia, Telia Company, Verizon Wireless, Intel?, Reno, Nevada, USA, Nov. 27-Dec. 1, 2017,total 7 pages.

3GPP TSG-WG SA2 Meeting #134 ,S2-1908354, Huawei, HiSilicon, CATT, Samsung, Nokia, Nokia Shanghai Bell, Clarification and correction to AF response, Sapporo, Japan, Jun. 24-Jun. 28, 2019,total 9 pages.

* cited by examiner

SYSTEMS AND METHODS FOR SUPPORTING TRAFFIC STEERING THROUGH A SERVICE FUNCTION CHAIN

CROSS-REFERENCE TO RELATED APPLICATIONS

This application is a continuation of U.S. patent application Ser. No. 17/552,006 filed Dec. 15, 2021 entitled "SYSTEMS AND METHODS FOR SUPPORTING TRAFFIC STEERING THROUGH A SERVICE FUNCTION CHAIN", which is a continuation of International Application No. PCT/CN2019/126550 filed Dec. 19, 2019, which claims the benefit of U.S. provisional patent application no. 62/881,256 filed on Jul. 31, 2019, the contents of which are incorporated herein by reference in their entirety.

FIELD OF THE INVENTION

The present disclosure generally relates to the field of communications networks, and particular embodiments or aspects relate to systems and methods for routing traffic through a service function chain.

BACKGROUND

In a 3GPP system or network, in particular, a 5G system, traffic (e.g. traffic originated from a user equipment (UE)) may need to be routed through a service function chain (e.g. composed of functions chained in a particular order) before reaching the final destination (e.g. an application server or a UE). The service function chain may include at least one function that processes the received traffic and may be referred to as a Data Processing Function (DPF). The DPF may be a network function or an application-layer function that processes the received traffic or perform operations on traffic. Such operations may include firewall, lawful interception, and deep packet investigation before the packets are forwarded to the final destination, or to the backbone network or to the users.

The service function chain may be deployed locally close to the edge of the network (e.g. in one or multiple local instances of the data network (DN)) while the final destination may be located in the DN or may be a UE. When routing traffic through the service function chain, e.g. from a first DPF to a second DPF, the traffic may have to be routed via user plane functions (UPFs) in the 3GPP system, such that the traffic may be routed from the first DPF to a UPF and then to the second DPF and so on.

In some scenarios, traffic may be selectively (i.e. some packets of the traffic are selected to be) steered toward or routed through the service function chain, while in other scenarios, all traffic may be steered toward or routed through the service function chain. This scenario may be referred to as selective traffic steering.

In some scenarios, when the UE is accessing an application deployed close to the edge of the network, the application may be relocated from location to location, e.g. in the event that the UP path used to access the application changes. As the application relocates, the address of the application (or application server hosting the application) may change. The UE should be notified of the address change in order to maintain the continuity of application layer session and service. This scenario may be referred to as application server discovery.

Accordingly, there is a need for a system and method that at least partially addresses one or more limitation of the prior art.

This background information is intended to provide information that may be of possible relevance to understanding problems solved by the present disclosure. No admission is necessarily intended, nor should be construed, that any of the preceding information constitutes prior art against the present disclosure.

SUMMARY

It is an object of the present disclosure to obviate or mitigate at least one disadvantage of the prior art.

An aspect of the disclosure provides for a method for steering traffic of at least one protocol data unit (PDU), by a session management function (SMF). The method includes receiving information from one of a policy control function (PCF) and an operations, administration and maintenance or management (OAM) system. The information includes service function chain information indicating that the at least one PDU should be routed through a service function chain including at least one Data Processing Function (DPF), in a particular order. The method further includes configuring at least one user plane function (UPF) according to the information. In some embodiments, the information further includes a final delivery indication, indicating that the PDU should be routed to a final destination after being routed through the service function chain. In some embodiments the information further includes selective traffic steering information and associated parameters indicating that a PDU of the at least one PDU should be selectively routed to the service function chain. In some embodiments, the information further includes information to identify the traffic and information on at least on UE. In some embodiments, the step of configuring at least one user plane function (UPF) according to the information includes instructing a UPF to receive the at least one PDU from a first DPF of the service function chain. In some embodiments the step of configuring at least one user plane function (UPF) according to the information further includes instructing the UPF to send the at least one PDU to a second DPF of the service function chain. In some embodiments, the step of configuring at least one user plane function (UPF) according to the information includes instructing a UPF to receive the at least one PDU from a DPF of the service function chain. In some embodiments, the step of configuring at least one UPF according to the information further includes instructing the UPF to send the at least one PDU to the final destination. In some embodiments, the step of configuring at least one UPF according to the information further includes generating rules according to the information for at least one UPF, the rules including at least one packet detection rule (PDR) for at least one UPF, and at least one forwarding action rule (FAR) for at least one UPF. In some embodiments one PDR of the at least one PDR is associated with two FARs of the at least two FAR, the one PDR include information about traffic selection to support selective traffic steering. In some embodiments, the step of configuring at least one UPF according to the information includes generating rules according to the information for at least one UPF, the rules comprising at least one packet detection rule (PDR) for at least one UPF, and at least one forwarding action rule (FAR) for at least one UPF. In some embodiments the one PDR of the at least one PDR is associated with one FAR of the at least one FARs. In some embodiments the one FAR includes information about traffic selection to support selective traffic steering. In some embodiments, the step of configuring at least one UPF according to the information further includes instructing the at least one UPF to select a PDU from the at least one PDU according to a selection strategy included in the at least one PDR, the selection strategy is one of: select all, select randomly, select a PDU based on a certain number of successive PDUs, and select a PDU according to a time window. In some embodiments, the step of configuring at least one UPF according to the information further includes instructing the at least one UPF to duplicate the selected PDU, wherein duplication includes one of duplicating the selected PDU and a header of the selected PDU. In some embodiments, the step of configuring at least one UPF according to the information further includes instructing the at least one UPF to route the duplicated PDU according to the at least one FAR. In some embodiments, the step of configuring at least one UPF according to the information further includes instructing the at least one UPF to select a PDU from the at least one PDU according to a selection strategy included in the at least one FAR, the selection strategy is one of: select all, select randomly, select a PDU based on a certain number of unselected PDUs; and select a PDU according to a time window. In some embodiments, the step of configuring at least one UPF according to the information further includes instructing the at least one UPF to duplicate the selected PDU, wherein duplication includes duplicating the selected PDU and a header of the selected PDU. In some embodiments, the step of configuring at least one UPF according to the information further includes instructing the at least one UPF to route the duplicated PDU according to the at least one FAR. In some embodiments, the method further includes sending a notification message to one of the AF and the OAM via the NEF, the notification message including at least one selected location of a DPF and N6 traffic routing information related to the at least one UPF.

Another aspect of the disclosure provides for a network node including at least one network interface, at least one processor, and a non-transient computer readable memory for storing instructions which when executed by the at least one processor configure the network function to execute the methods described here. For example, such a network function is configured to receive information from one of a policy control function (PCF) and an operations, administration and maintenance or management (OAM) system. The information including service function chain information indicating that the at least one PDU should be routed through a service function chain comprising at least one Data Processing Function (DPF), in a particular order. The network node is further configured to configure at least one user plane function (UPF) according to the information.

Another aspect of the disclosure provides for a method of steering traffic of at least one packet data unit (PDU), by at least one user plane function (UPF). The method includes receiving rules, from a session management function (SMF), the rules including at least one packet detection rule (PDR) and at least one forwarding action rule (FAR); the at least one PDR indicating that the at least one PDU is from a data processing function (DPF) of a service function chain. The method further includes receiving the at least one PDU from the first DPF of a service function chain. The method further includes detecting according to the PDRs that the at least one PDU is from a first DPF of a service function chain. The method further includes sending the at least one PDU according to the at least one FAR. In some embodiments the step of sending the at least one PDU according to the at least one FAR includes sending the at least one PDU to a second DPF of the service function chain.

Another aspect of the disclosure provides for a network node including at least one network interface, at least one processor, and a non-transient computer readable memory for storing instructions which when executed by the at least one processor configure the network function to execute the methods described here. For example, such a network function is configured to receive rules, from a session management function (SMF), the rules comprising at least one packet detection rule (PDR) and at least one forwarding action rule (FAR); the at least one PDR indicating that the at least one PDU is from a data processing function (DPF) of a service function chain. The network node is further configured to receive the at least one PDU from the first DPF of a service function chain. The network is further configured to detect according to the PDRs that the at least one PDU is from a first DPF of a service function chain. The network node is further configured to send the at least one PDU according to the at least one FAR.

Another aspect of the disclosure provides for a method of notifying a user equipment (UE) about a new address of an application, by a session management function (SMF). The method includes receiving information from one of a policy control function (PCF) and an operations, administration and maintenance (OAM) system, the information including domain name of the application. The method further includes notifying one of the AF and the OAM system about Data Network Access Identifier (DNAI) change. The method further includes receiving a response form one of the AF and the OAM, the response including at least one of a new address of the application and domain name of the application. The method further includes acting on the received response. In some embodiments the step of acting on the received response includes sending the UE a notification message, the notification message including at least one of the new address of the application and the domain name of the application. In some embodiments, the notification message is sent via an Access and Mobility Management Function and a radio access network node. Another aspect of the disclosure provides for a network node including at least one network interface, at least one processor, and a non-transient computer readable memory for storing instructions which when executed by the at least one processor configure the network function to execute the methods described here. For example, such a network function is configured to receive information from one of a policy control function (PCF) and an operations, administration and maintenance (OAM) system, the information comprising domain name of the application. The network node is further configured to notify one of the AF and the OAM system about Data Network Access Identifier (DNAI) change. The network node is further configured to receive a response form one of the AF and the OAM, the response comprising at least one of a new address of the application and domain name of the application. The network node is further configured to act on the received response.

Another aspect of the disclosure provides a system. The system includes a session management function (SMF) configured to receive information from one of a policy control function (PCF) and an operations, administration and maintenance or management (OAM) system. The information including: service function chain information indicating that the at least one PDU should be routed through a service function chain comprising at least one Data Processing Function (DPF), in a particular order. The SMF is further configured to configure the at least one UPF, by the SMF, according to the information received. The system further includes at least one user plane function (UPF) configured to receive rules, from the SMF, the rules including at least one packet detection rule (PDR) and at least one forwarding action rule (FAR); the at least one PDR indicating that the at least one PDU is from DPF of the service function chain. The at least one UPF is further configured to receive the at least one PDU from the first DPF of the service function chain. The at least one UPF is further configured to detect according to the PDRs that the at least one PDU is from a first DPF of a service function chain. The at least one UPF is further configured to send the at least one PDU according to the rules. In some embodiments, the information further comprises a final delivery indication, indicating that the PDU should be routed to a final destination after being routed through the service function chain, and the at least one UPF is further configured to perform one of: sending the at least one PDU to a second DPF of the service function chain; and sending the at least one PDU to a final destination. In some embodiments the information further comprise selective traffic steering information and associated parameters indicating that a PDU of the at least one PDU should be selectively routed to the service function chain and the SMF is further configured to generate rules for at least one UPF according to the information, wherein the rules include information about traffic selection to support selective traffic steering, and the at least one UPF is further configured to select a PDU from the at least one PDU according to a selection strategy included in the rules, the selection strategy is one of: select all, select randomly, select a PDU based on a certain number of successive PDUs, and select a PDU according to a time window. In some embodiments, the at least one UPF is further configured to duplicate the selected PDU, wherein duplication comprises one of duplicating the selected PDU and a header of the selected PDU. In some embodiments, the at least one UPF is further configured to route the duplicated PDU according to the rules.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
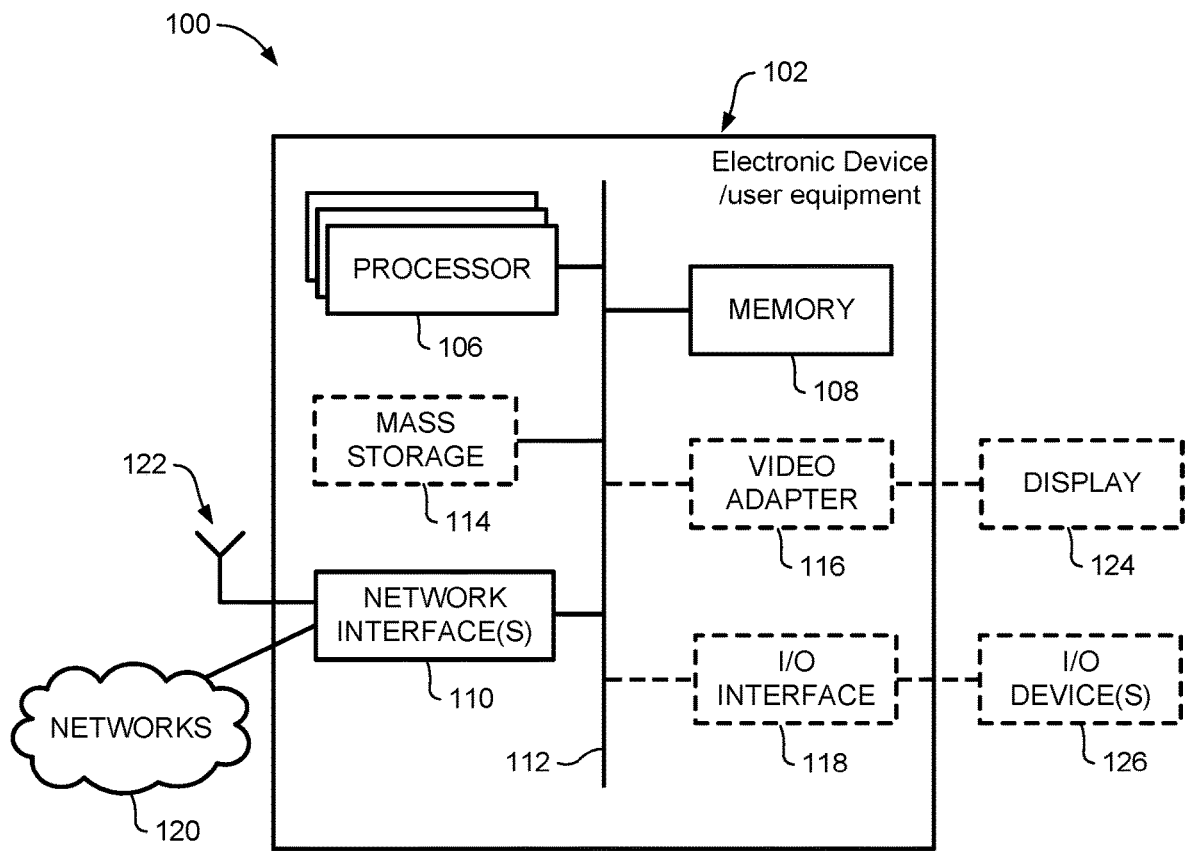
FIG. 1 is a block diagram of an electronic device within a computing and communications environment that may be used for implementing devices and methods in accordance with representative embodiments of the present disclosure.

In the following description, features of the present disclosure are described by way of example embodiments and include solutions to support or enable the scenarios discussed above (routing through service function chain, selective traffic steering, and application server discovery). The solutions provided in the disclosure apply to 3GPP system (in particular, the 5GS) and to non-roaming and to Local Breakout (LBO) deployments i.e. to cases where the involved entities (application function (AF), policy control function (PCF), session management function (SMF), UPF) belong to the Visited Public Land Mobile Network (VPLMN) or AF belongs to a third party with which the VPLMN has an agreement. For convenience of description, these embodiments make use of features and terminology known from communication system specifications, such as 4G and 5G networks, as defined by the Third Generation Partnership Project (3GPP). However, it may be understood that the present disclosure is not limited to such networks FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB)), a home subscriber server (HSS), a gateway (GW) such as a packet gateway (PGW) or a serving gateway (SGW) or various other nodes or functions within an evolved packet core (EPC) network. In other embodiments, the electronic device 102 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with the memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Embodiments provide an AF influence solution framework on traffic routing.

An AF may send requests to influence SMF routing decisions for a traffic of a protocol data unit (PDU) Session. The AF requests may influence UPF (re)selection and allow routing user traffic to a local access to a Data Network (identified by a Data Network Access Identifier (DNAI)). The AF may issue requests on behalf of applications not owned by the Public Land Mobile Network (PLMN) serving the UE. If the operator does not allow an AF to access the network directly, the AF shall use a Network Exposure Function (NEF) to interact with the 5GC. The AF may be in charge of the (re)selection or relocation of the applications within the local DN. Such functionality is not defined. For this purpose, the AF may request to get notified about events related with PDU Sessions.

Figure 2A:
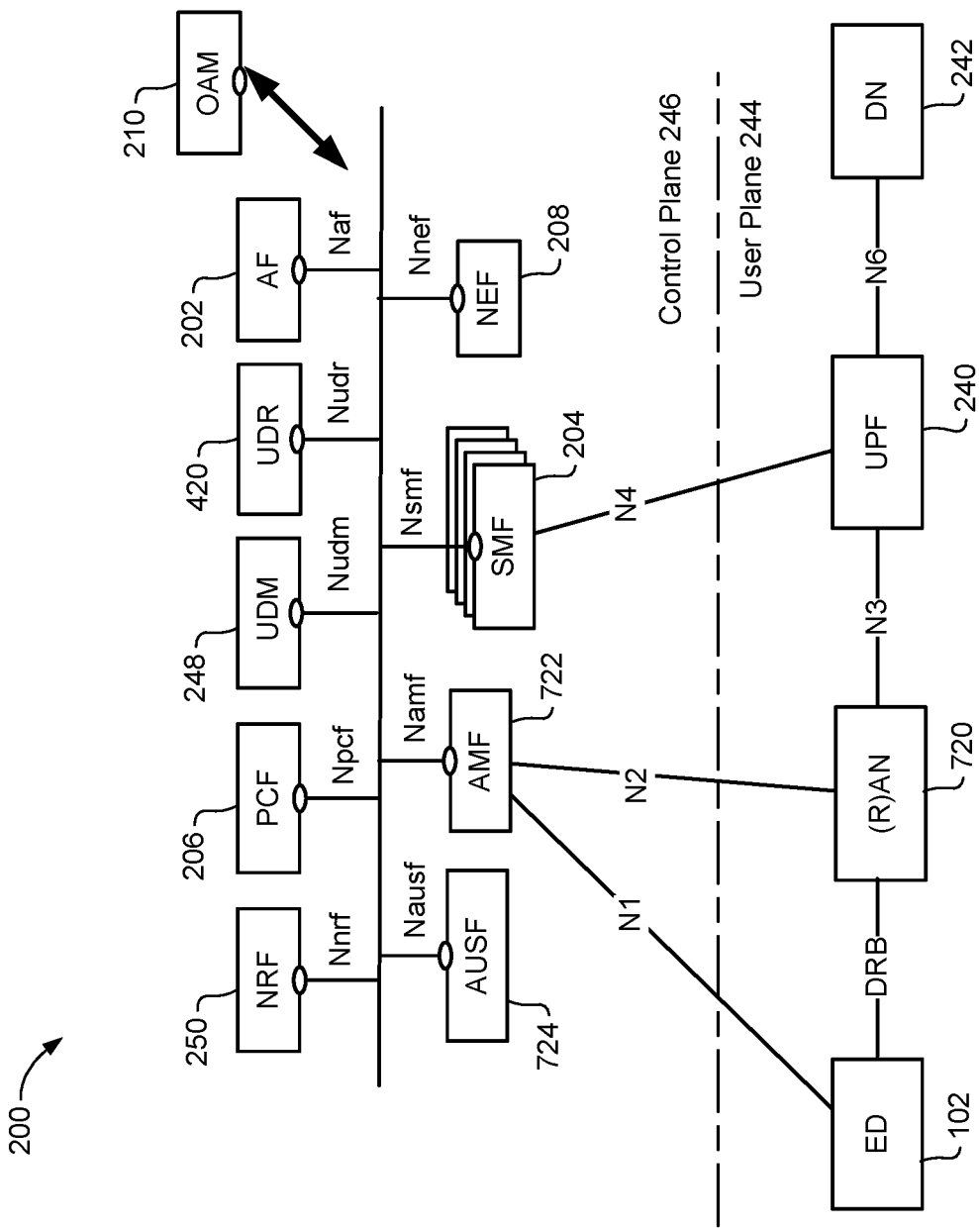
FIG. 2A block diagram illustrating a service-based view of a system architecture of a 5G Core Network.

FIG. 2A illustrates a service-based architecture 200 for a 5G or Next Generation Core Network (5GCN/NGCN/NCN). This illustration depicts logical connections between nodes and functions, and its illustrated connections should not be interpreted as direct physical connections. ED 102 forms a radio access network connection with a (Radio) Access Network ((R)AN) node 720 (which may, for example, be an gNodeB (gNB)), which is connected to a User Plane (UP) Function (UPF) 240 such as a UP Gateway over a network interface providing a defined interface such as an N3 interface. UPF 240 provides a logical connection to a Data Network (DN) 242 over a network interface such as an N6 interface. The radio access network connection between the ED 102 and the (R)AN node 720 may be referred to as a Data Radio Bearer (DRB).

DN 242 may be a data network used to provide an operator service, or it may be outside the scope of the standardization of the Third Generation Partnership Project (3GPP), such as the Internet, a network used to provide third party service, and in some embodiments DN 242 may represent an Edge Computing network or resource, such as a Mobile Edge Computing (MEC) network.

ED 102 also connects to the Access and Mobility Management Function (AMF) 722 through a logical N1 connection (although the physical path of the connection is not direct). The AMF 722 is responsible for authentication and authorization of access requests, as well as mobility management functions. In a service based view, AMF 722 can communicate with other core network control plane functions through a service based interface denoted as Namf.

The Session Management Function (SMF) 204 is a network function that is responsible for the allocation and management of IP addresses that are assigned to an ED as well as the selection of a UPF 240 (or a particular instance of a UPF 240) for traffic associated with a particular session of ED 102. It will be appreciated that there will typically be multiple SMFs 240 in the network 200, each of which may be associated with a respective group of EDs 102, (R)AN nodes 720 or UPFs 240. The SMF 204 can communicate with other core network functions, in a service based view, through a service based interface denoted as Nsmf. The SMF 204 may also connect to a UPF 240 through a logical interface such as network interface N4.

The Authentication Server Function (AUSF) 724, provides authentication services to other network functions over a service based Nausf interface.

A Network Exposure Function (NEF) 208 can be deployed in the network to allow servers, functions and other entities such as those outside a trusted domain to have exposure to services and capabilities within the network. In one such example, an NEF 208 can act much like a proxy between an application server outside the illustrated network and network functions such as the Policy Control Function (PCF) 206, the SMF 204, the UDM 248, and the AMF 722, so that the external application server can provide information that may be of use in the setup of the parameters associated with a data session. The NEF 208 can communicate with other network functions through a service based Nnef network interface. The NEF 208 may also have an interface to non-3GPP functions.

A Network Repository Function (NRF) 250, provides network service discovery functionality. The NRF 250 may be specific to the Public Land Mobility Network (PLMN) or network operator, with which it is associated. The service discovery functionality can allow network functions and EDs connected to the network to determine where and how to access existing network functions, and may present the service based interface Nnrf.

PCF 206 communicates with other network functions over a service based Npcf interface, and can be used to provide policy and rules to other network functions, including those within the control plane. Enforcement and application of the policies and rules is not necessarily the responsibility of the PCF 206, and is instead typically the responsibility of the functions to which the PCF 206 transmits the policy. In one such example the PCF 206 may transmit policy associated with session management to the SMF 204. This may be used to allow for a unified policy framework with which network behavior can be governed.

A Unified Data Management Function (UDM) 248 can present a service based Nudm interface to communicate with other network functions, and can provide data storage facilities to other network functions. Unified data storage can allow for a consolidated view of network information that can be used to ensure that the most relevant information can be made available to different network functions from a single resource. This can make implementation of other network functions easier, as they do not need to determine where a particular type of data is stored in the network. The UDM 248 may employ an interface, such as Nudr to connect to a User Data Repository (UDR) 420. The PCF 206 may be associated with the UDM 248 because it may be involved with requesting and providing subscription policy information to the UDR 420, but it should be understood that typically the PCF 206 and the UDM 248 are independent functions.

The PCF 206 may have a direct interface to the UDR 420 or can use Nudr interface to connection with UDR 420. The UDM 248 can receive requests to retrieve content stored in the UDR 420, or requests to store content in the UDR 420. The UDM 248 is typically responsible for functionality such as the processing of credentials, location management and subscription management. The UDR 420 may also support any or all of Authentication Credential Processing, User Identification handling, Access Authorization, Registration/Mobility management, subscription management, and Short Message Service (SMS) management. The UDR 420 is typically responsible for storing data provided by the UDM 248. The stored data is typically associated with policy profile information (which may be provided by PCF 206) that governs the access rights to the stored data. In some embodiments, the UDR 420 may store policy data, as well as user subscription data which may include any or all of subscription identifiers, security credentials, access and mobility related subscription data and session related data.

The Application Function (AF) 202 represents the non-data plane (also referred to as the non-user plane) functionality of an application deployed within a network operator domain and within a 3GPP compliant network. The AF 202 interacts with other core network functions through a service based Naf interface, and may access network capability exposure information, as well as provide application information for use in decisions such as traffic routing. The AF 202 can also interact with functions such as the PCF 206 to provide application specific input into policy and policy enforcement decisions. It should be understood that in many situations the AF 202 does not provide network services to other NFs, and instead is often viewed as a consumer or user of services provided by other NFs. An application outside the 3GPP network, can perform many of the same functions as AF 202 through the use of NEF 208.

The operations, administration and maintenance or management (OAM) 210 is a network management plane function which provides configuration, operations, and maintenance and support services for the Control Plane (CP) and UP functions.

The ED 102 communicates with network functions that are in the User Plane (UP) 244, and the CP 246. The UPF 240 is a part of the CN UP 244 (DN 242 being outside the 5GCN). (R)AN node 720 may be considered as a part of a User Plane, but because it is not strictly a part of the CN, it is not considered to be a part of the CN UP 244. AMF 722, SMF 204, AUSF 724, NEF 208, NRF 250, PCF 206, and UDM 248 are functions that reside within the CN CP 246, and are often referred to as CP Functions. AF 202 may communicate with other functions within CN CP 246 (either directly or indirectly through the NEF 208), but is typically not considered to be a part of the CN CP 246.

Figure 2B:
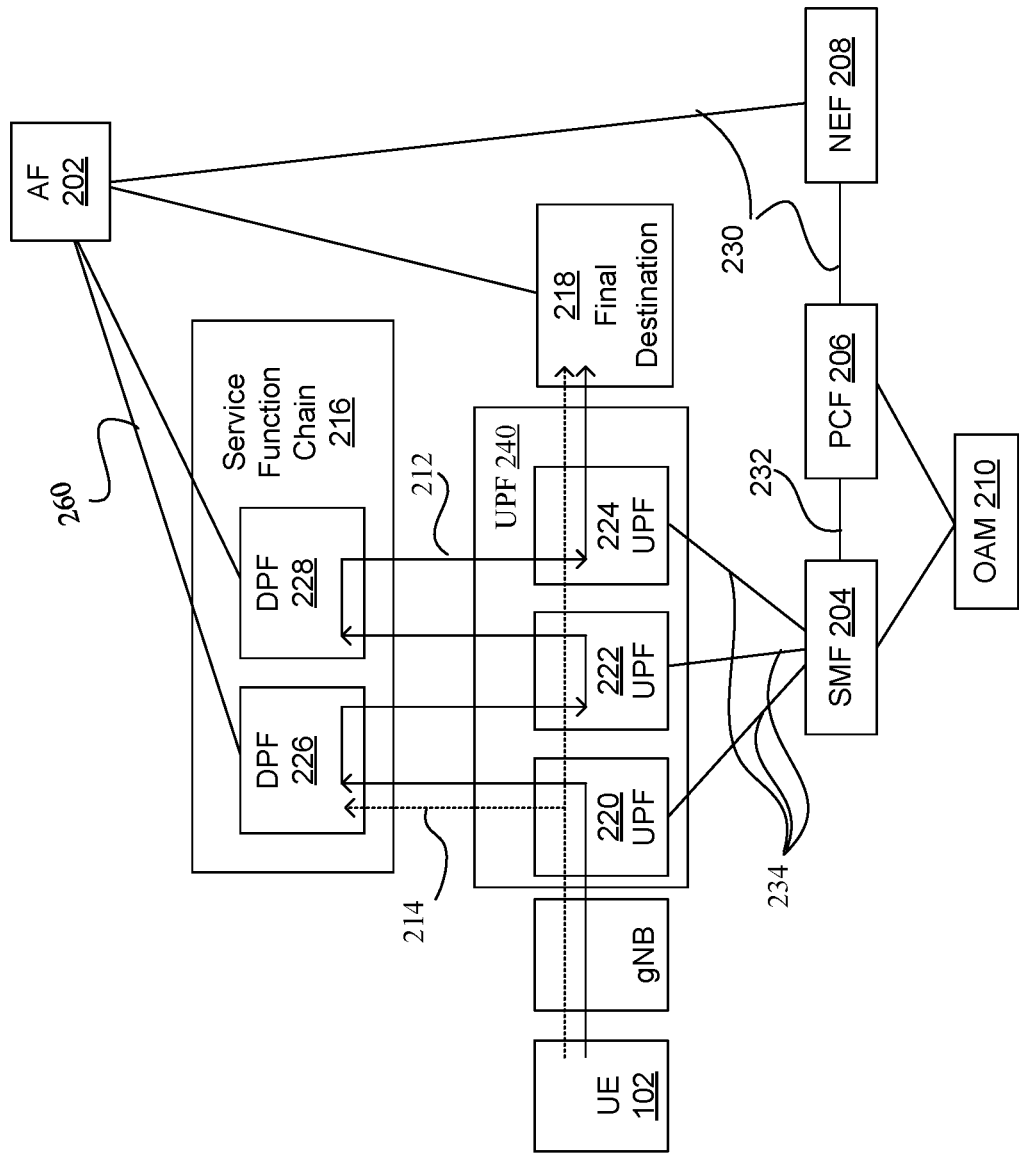
FIG. 2B is an illustration embodiment of a proposed tunneling to coordinate the service function chain and UPFs, according to an embodiment of the present disclosure.

Those skilled in the art will appreciate that there may be a plurality of UPFs, e.g., Intermediate-UPFs (I-UPF, for example, as shown in FIG. 2B, UPFs 220, 222, and 224) connected in series between the (R)AN node 720 and the DN 242, and multiple data sessions to different DNs can be accommodated through the use of multiple UPFs in parallel.

FIG. 2B is a general illustration of routing traffic through a service function chain, according to an embodiment of the present disclosure;

Referring to FIG. 2B, the control plane functions (e.g. SMF 204, PCF 206, NEF 208) may receive requirements or requests from an external function (e.g. an AF 202), or configuration information/parameters from the network operations, administration and maintenance or management (OAM) system 210, to enable or influence or enforce traffic steering control on some traffic flows. It should be noted that the requirements or requests from the AF 202 may be firstly sent 230 to a PCF 206 (via an NEF 208 or without going through an NEF 208) and be transformed into policies by the PCF 206, and the PCF then updates the policies 232 to an SMF 204 that is serving a PDU Session associated/related to the traffic flow 212 and 214 or carrying the traffic flow 212 and 214.

Shown as traffic flow 212, the requirements or requests (or configuration information or parameters) from AF 202 (respectively, the OAM 210) may indicate that the traffic from the UE 102 should be routed through a service function chain 216 (e.g. deployed locally in one or multiple local instances of the DN 242) and the Final Destination 218 (e.g. an application server in the DN 242 or a UE). If the control plane function receiving the requirements or requests from the AF 202 or OAM 210 is a PCF 206, the control plane function (i.e. the PCF 206) may generate policies based on the requirement or request and provide 232 the polices to an SMF 204 that is serving a PDU Session associated to the traffic flow 212 or 214 or carrying the traffic flow 212 or 214. Per the polices received from the PCF 206, or per the configuration information/parameters from OAM 210, the SMF 204 may configure UPF(s) accordingly by sending 234 configuration parameters or rules to the UPF(s), such as attributes in N4 forwarding action rules and packet detection rules or simply sending the forwarding action rules and/or the packet detection rules to the UPF(s). The configuration parameters or rules may be generated by the SMF 204 based on polices received from the PCF 206 or the configuration information/parameters from OAM 210.

In some embodiments, the UPFs 220, 222, 224 may use the configuration parameters or rules provided by the SMF 204 to route the traffic. In some embodiments the traffic may be routed through the service function chain 216 as shown by the traffic flow 212 (traffic is routed in the following order: UPF 220, DPF 226, UPF 222, DPF 228, UPF 224, and final destination 218). In some embodiments some traffic may be selectively duplicated, according to a traffic selection strategy, and sent 214 to a DPF 226 of the service function chain 216, as shown by the traffic flow 214. In some embodiments, at least two of the UPFs 240s, for example UPFs 220, 222, and 224 may be the same entity/UPF. Further details of the embodiments are discussed below.

Figure 3:
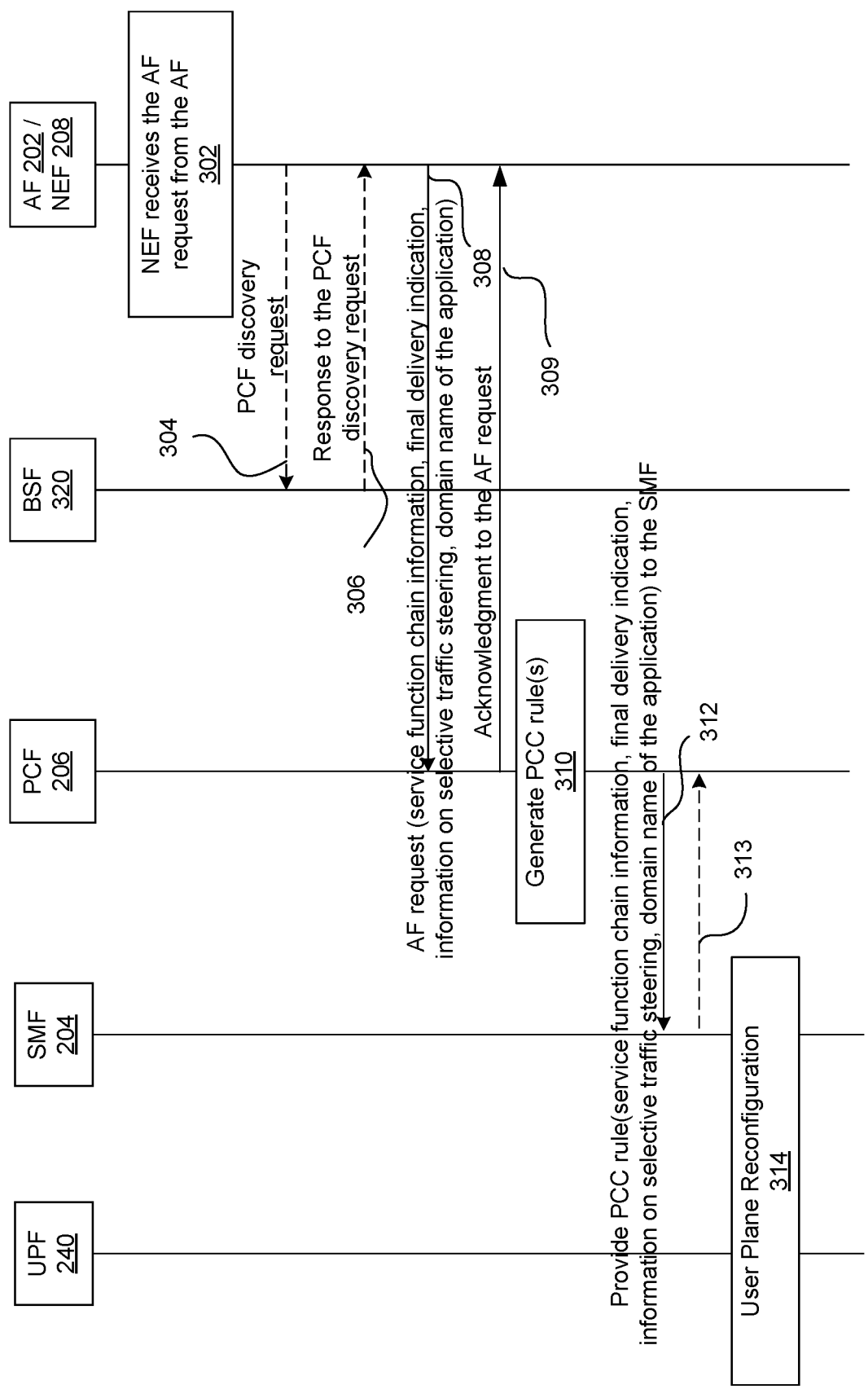
FIG. 3 is an illustration of handling an AF request targeting an individual UE address to the relevant PCF, according to an embodiment of the present disclosure.
Figure 4:
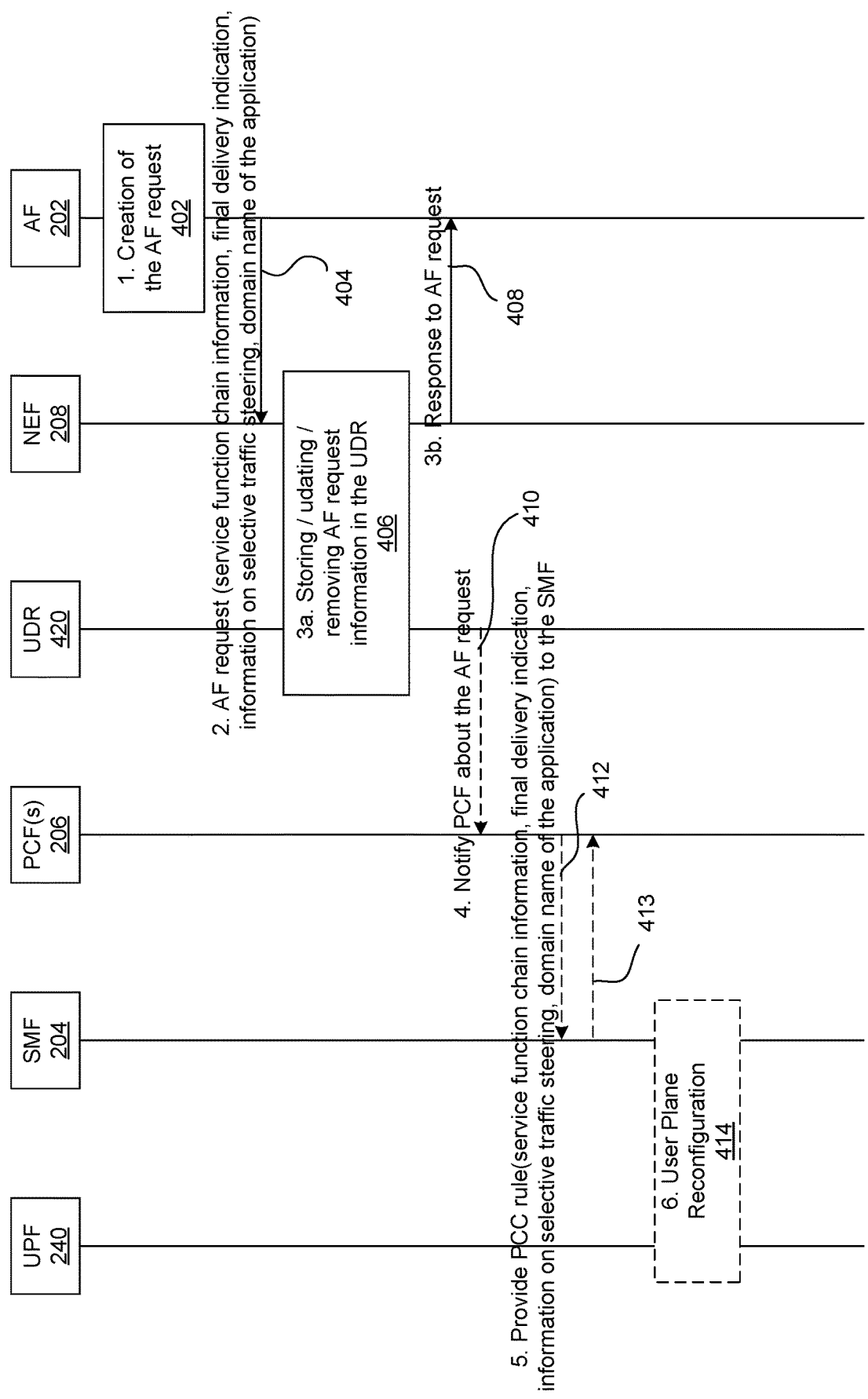
FIG. 4 is an illustration embodiment of processing AF requests to influence traffic routing for sessions not identified by a UE address, according to an embodiment of the present disclosure.
Figure 5:
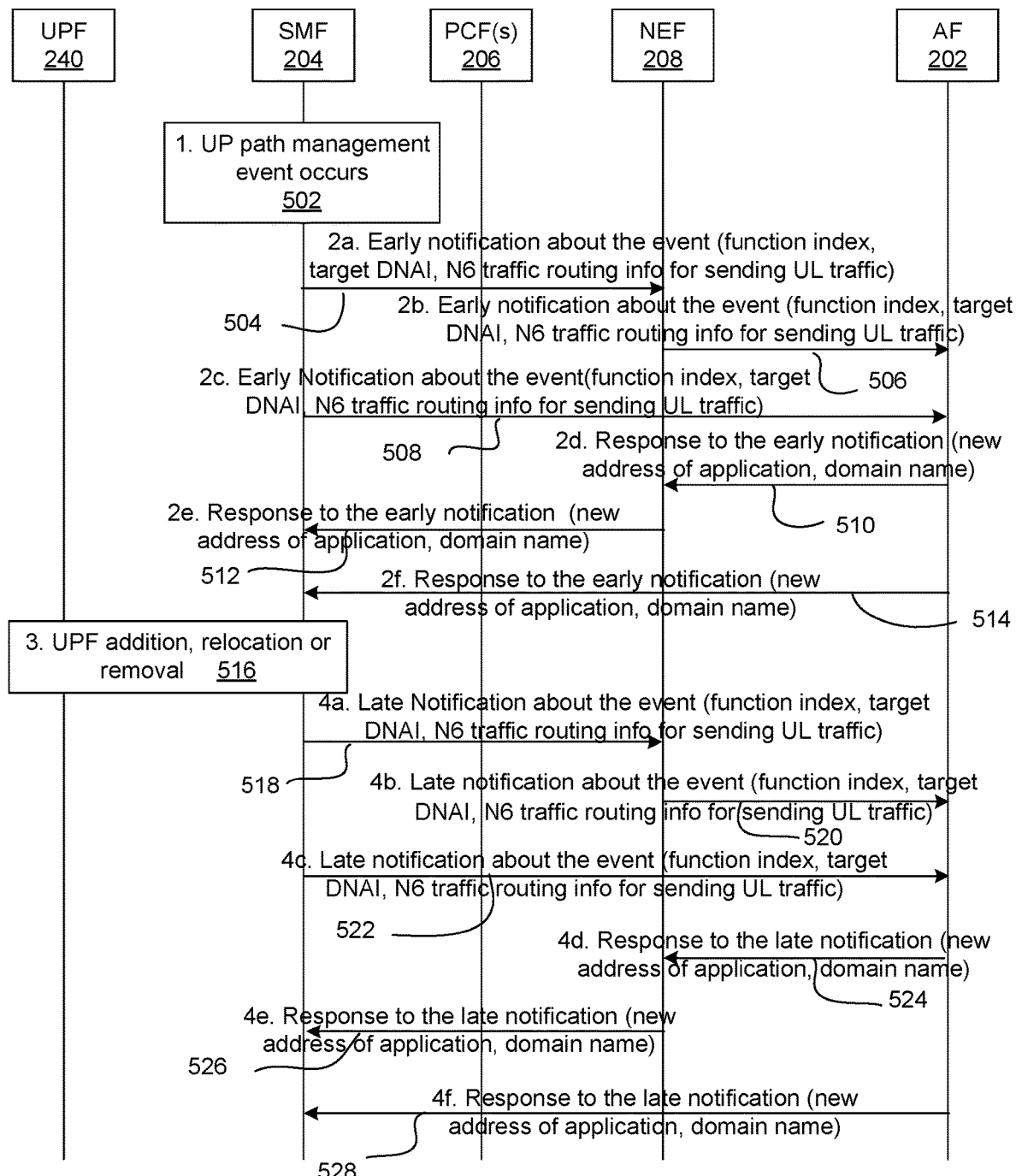
FIG. 5 is an illustration notification of user plane management event, according to an embodiment of the present disclosure.

FIG. 3 is an illustration of handling an AF request targeting an individual UE address to the relevant PCF, according to an embodiment of the present disclosure. The AF requests are sent to the PCF 206 via a direct interface such as N5 interface, where the N5 interface is an interface in the control plane 246, between PCF 206 and AF 202, (e.g. in the case of requests targeting specific on-going PDU Sessions of individual UE(s) and an AF allowed to interact directly with the 5GC NFs, as illustrated in FIG. 3) or via the NEF 208. FIG. 4 is an illustration of processing AF requests to influence traffic routing for sessions not identified by a UE address (and thus the sessions may be future sessions), according to an embodiment of the present disclosure. The AF requests that target existing or future PDU Sessions of multiple UE(s) or of any UE are sent via the NEF 208 (as illustrated in FIG. 4) and may target multiple PCF(s) 206. The PCF(s) 206 transform(s) (e.g. step 310 in FIG. 3 or step 412 in FIG. 4) the AF requests into policies that apply to PDU Sessions. FIG. 5 is an illustration notification of user plane management event, according to an embodiment of the present disclosure. When the AF 202 has subscribed to UP path management event notifications from SMF(s) 204 (including notifications on how to reach a GPSI over N6 interface), such notifications are sent either directly to the AF 202 or via an NEF 208 (without involving the PCF 206), as illustrated in FIG. 5. N6 interface is an interface in the user plan 244 between UPF 240 and the DN 242, as shown in FIG. 2A.

For AF 202 interacting with PCF 206 directly or via NEF 208, the AF requests may contain the information as described below.

The AF request may have information to identify the traffic. The traffic can be identified in the AF request by either a DNN and possibly slicing information (S-NSSAI) or an AF-Service-Identifier. When the AF 202 provides an AF-Service-Identifier, i.e. an identifier of the service on behalf of which the AF 202 is issuing the request, the 5G Core (e.g. the NEF 208) maps this identifier into a target DNN and slicing information (S-NSSAI). When the NEF 208 processes the AF request, the AF-Service-Identifier may be used to authorize the AF request.

The AF request may have an application identifier or traffic filtering information (e.g. 5 Tuple, indicating or including a source IP address, a source port number, a destination IP address, a destination port number and a protocol or type of protocol in use). The application identifier refers to an application handling UP traffic. It may map to packet detection rule(s). The UPF 240 may use the application identifier (e.g. identify the corresponding packet detection rule(s) and use the packet detection rule(s) to) to detect the traffic of the application. When the AF request is for influencing SMF routing decisions, the information is to identify the traffic to be routed. When the AF request is for subscription to notifications about UP path management events, the information is to identify the traffic that the events relate to.

The AF request may have information about the N6 traffic routing requirements for traffic identified as defined in the request, as discussed above. This information about N6 traffic routing may include information about the N6 traffic routing requirements that is provided per DNAI: for each DNAI, the N6 traffic routing requirements may contain a routing profile ID and/or N6 traffic routing information. The information about N6 traffic routing requirements may further include an optional indication of traffic correlation, when the information on the UE(s) (the information in the AF request) identifies a group of UEs. This implies the targeted PDU Sessions should be correlated by a common DNAI for the traffic identified in the request. If this indication is provided by the AF 202, the 5GC (e.g. the SMF 204) should select a common DNAI for the target PDU Sessions from the list of DNAI(s) specified in the AF request, which indicate or represent potential locations of applications towards which the traffic should apply.

The N6 traffic routing requirements are related to the mechanism enabling traffic steering in the local access to the DN. The routing profile ID refers to a pre-agreed policy between the AF 202 and the 5GC. This policy may refer to different steering policy ID(s) sent to SMF 204 and may be based on e.g. time of the day etc.

The AF request may include potential locations of applications towards which the traffic routing should apply. The potential location of application is expressed as a list of DNAI(s) as discussed above. If the AF 202 interacts with the PCF 206 via the NEF 208, the NEF 208 may map the AF-Service-Identifier information (in the AF request) to a list of DNAI(s). The DNAI(s) may be used by the SMF 204 for UPF (re)selection, i.e. to (re)select UPF for a PDU Session related to or impacted by the AF request.

The AF request may include information on the UE(s). The information on the UE(s) may correspond to: individual UEs identified using GPSI, or an IP address/Prefix or a MAC address; groups of UEs identified by an External Group Identifier when the AF 202 interacts via the NEF 208, or Internal-Group Identifier when the AF 202 interacts directly with the PCF 206; and any UE accessing the combination of DNN, S-NSSAI and DNAI(s).

When the PDU Session type is IPv4 or IPv6 or IPv4v6, and the AF 202 provides an IP address and/or an IP Prefix, or when the PDU Session type is Ethernet and the AF 202 provides a MAC address. This allows the PCF 206 to identify the PDU Session for which this request applies, and the AF request applies only to that specific PDU Session of the UE 102. In this case, additional information such as the UE identity may also be provided to help the PCF 206 to identify the correct PDU Session. Otherwise the request targets multiple UE(s) and shall apply to any existing or future PDU Sessions that match the parameters in the AF request.

When the AF request targets an individual UE and GPSI is provided within the AF request, the GPSI is mapped (e.g. by the NEF 208) to SUPI according to the subscription information received from UDM.

When the AF request targets any UE or a group of UE(s), the AF request is likely to influence multiple PDU Sessions possibly served by multiple SMFs 204 and PCFs 206.

When the AF request targets a group of UE(s) it provides one or several group identifiers (e.g. External Group Identifiers) in its request. The group identifiers provided by the AF 202 are mapped to Internal-Group identifiers. Members of the group have this Group Identifier (the Internal-Group identifier of the group) in their subscription data, e.g. stored the UDR or UDM. The Internal-Group Identifier is stored in Unified Data Management Function UDM, retrieved by SMF 204 from UDM and passed by SMF 204 to PCF 206 at PDU Session set-up. The PCF 206 can then map the AF requests with user subscription and determine whether an AF request targeting a group of users applies to a PDU Session.

When the AF request is for influencing SMF routing decisions, the information (i.e. information on the UE(s)) is to identify UE(s) whose traffic is to be routed. When the AF request is for subscription to notifications about UP path management events, the information is to identify UE(s) whose traffic the events relate to.

The AF request may further include information on AF subscription to corresponding SMF events. The AF 202 may request to be subscribed to change of UP path associated with traffic identified in the AF request (as discussed above). The AF request may contain a type of subscription (subscription for Early and/or Late notifications). The AF subscription can be for Early notifications and/or Late notifications. In the case of a subscription for Early notifications, the SMF sends the notifications before the (new) UP path is configured. In the case of a subscription for Late notifications, the SMF sends the notification after the (new) UP path has been configured.

Optionally, an indication of "AF acknowledgment to be expected" may be included in the AF request. This indication implies that the AF 202 will provide a response to the notifications of UP path management events to the 5GC. The SMF 204 may, according to this indication, determine to wait for a response from the AF 202 before the SMF 204 configures in the case of early notification, or activates in the case of late notification, the new UP path.

The AF subscription can also request to receive information associating the GPSI of the UE with the IP address(es) of the UE and/or with actual N6 traffic routing to be used to reach the UE on the PDU Session. In this case, the corresponding information is sent by the SMF 204 regardless of whether a DNAI applies to the PDU Session.

The AF request may include an AF transaction identifier referring to the AF request. This allows the AF 202 to update or remove the AF request and to identify corresponding UP path management event notifications. The AF transaction identifier is generated by the AF 202.

When the AF 202 interacts with the PCF 206 via the NEF 208, the NEF 208 maps the AF transaction identifier to an AF transaction internal identifier, which is generated by the NEF 208 and used within the 5GC to identify the information associated to the AF request. The NEF 208 maintains the mapping between the AF transaction identifier and the AF transaction internal identifier. The relation between the two identifiers is implementation specific.

When the AF 202 interacts with the PCF 206 directly, the AF transaction identifier provided by the AF 202 is used as AF transaction internal identifier within the 5GC.

The AF 202 may send (e.g. via steps 402, 404, 406, 410 in FIG. 4; or via steps 302, 308 in FIG. 3) the AF request to influence SMF routing decisions, for event subscription or for both.

The AF 202 may request to be subscribed to notifications about UP path management events (i.e. when a UP path change occurs for the PDU Session) by including Information on AF subscription to corresponding SMF events in the AF request. The corresponding notification about a UP path change sent (e.g. steps 504, 506, 508 and/or 518, 520, 522 in FIG. 5) by the SMF 204 to the AF 202 may indicate the DNAI and/or the N6 traffic routing information that has changed. The notification may include the AF transaction internal identifier, the type of notification (i.e. early notification or late notification), the Identity of the source and/or target DNAI, the IP address/prefix of the UE or the MAC address used by the UE, the GPSI and the N6 traffic routing information related to the 5GC UP.

The change from the UP path status where no DNAI applies to a status where a DNAI applies indicates the activation of this AF request. The change from the UP path status where a DNAI applies to a status where no DNAI applies indicates the de-activation of this AF request.

In the case of IP PDU Session Type, the IP address/prefix of the UE together with N6 traffic routing information indicates to the AF 202 how to reach, over the User Plane, the UE identified by its GPSI (in other words, the N6 traffic routing information can be used to send or route DL traffic toward the UE). N6 traffic routing information indicates any tunnelling that may be used over N6 interface or connection (e.g. an interface or connection between a UPF and an application location represented by DNAI). The nature of this information depends on the deployment.

The N6 traffic routing information may correspond to: the identifier of a VPN; explicit tunnelling information such as a tunnelling protocol identifier together with a Tunnel identifier; or tunnel end point information (e.g. ID, network, and/or port number) at the 5GC UP side (e.g. a UPF) for the N6 connection or interface.

In the case of Ethernet PDU Session Type, the MAC address of the UE together with N6 traffic routing information indicates to the AF 202 how to reach, over the User Plane, the UE identified by its GPSI.

When notifications about UP path management events are sent (e.g. steps 504 and 506 or steps 518 and 520 in FIG. 5) to the AF 202 via the NEF 208, if required, the NEF 208 maps the UE identify information, e.g. SUPI, to the GPSI and the AF transaction internal identifier to the AF transaction identifier before sending the notifications to the AF 202.

The PCF 206 authorizes the request (i.e. the AF request) received from the AF 202 based on information (e.g. information in the AF request such as AF-Service-Identifier) received from the AF 202, operator's policy, etc. and determines for each DNAI, a traffic steering policy ID (derived from the routing profile ID provided by the AF 202 in the AF request) and/or the N6 traffic routing information (as provided by the AF 202 in the AF request) to be sent (e.g. step 232 in FIG. 2B or step 312 in FIG. 3 or step 412 in FIG. 4) to the SMF 204 as part of the PCC rules. The traffic steering policy IDs are configured in the SMF 204 or in the UPF 240. The traffic steering policy IDs are related to the mechanism enabling traffic steering to the DN.

The DNAIs are related to the information considered by the SMF 204 for UPF selection, e.g. for diverting (locally) some traffic matching traffic filters provided by the PCF 206. The PCF 206 acknowledges (e.g. step 309 in FIG. 3) the AF request, if the AF request is targeting an individual PDU Session, to the AF 202 or to the NEF 208.

For PDU Session that corresponds to the AF request, the PCF 206 provides (e.g. step 232 in FIG. 2B or step 312 in FIG. 3 or step 412 in FIG. 4) the SMF 204 with a PCC rule that is generated based on the AF request. The PCC rule contains the information to identify the traffic, information about the DNAI(s) towards which the traffic routing should apply and optionally, an indication of traffic correlation. The PCC rule also contains, per DNAI, a traffic steering policy ID and/or N6 traffic routing information, if the N6 traffic routing information is explicitly provided in the AF request. The PCF 206 may also provide (e.g. step 232 in FIG. 2B or step 312 in FIG. 3 or step 412 in FIG. 4) in the PCC rule, information to subscribe the AF 202 (or the NEF 208) to SMF events (UP path changes) corresponding to the AF request, in which case the PCF 206 also provides/includes in the PCC rule the information on AF subscription to corresponding SMF events received in the AF request. This is done by providing the PCC rule at PDU Session set-up or by initiating a PDU Session Modification procedure. When initiating a PDU Session set-up or PDU Session Modification procedure, the PCF 206 determines the PCC rule provided to the SMF 204.

The SMF 204 may take the information in the PCC rule received (e.g. step 232 in FIG. 2B or step 312 in FIG. 3 or step 412 in FIG. 4) from the PCF 206 into account to (re)select UP paths (including DNAI(s)) for PDU Sessions. The SMF 204 is responsible for handling the mapping between the UE location (e.g. in the form of TAI/Cell-Id) and DNAI(s) associated with UPF 240 and applications and the selection of the UPF(s) 240 that serve a PDU Session. If the PCC rules are related to a 5G VN group (i.e. a UE group) served by the SMF 204 and if the information about the N6 traffic routing requirements includes an indication of traffic correlation, the SMF 204 should select a common DNAI for the PDU Sessions of the 5G VN group.

The SMF 204 may take the information in the PCC rule received (e.g. step 232 in FIG. 2B or step 312 in FIG. 3 or step 412 in FIG. 4) from the PCF 206 into account to configure traffic steering at UPF 240, including activating mechanisms for traffic multi-homing or enforcement of an UL Classifier (UL CL). This may include the SMF 204 providing (e.g. step 234 in FIG. 2B, or step 314 in FIG. 3, or step 414 in FIG. 4 or step 602 in FIG. 6) the UPF 240 with packet handling instructions (i.e. PDRs and FARs) for steering traffic to the local access to the DN. The packet handling instructions are generated by the SMF 204 using the traffic steering policy ID and/or the N6 traffic routing information in the PCC rules corresponding to the applied DNAI (e.g. the PCC rules being generated by the PCF 206 based on the AF request received from the AF 202, as described above). In the case of UP path reselection, the SMF 204 may configure (e.g. step 234 in FIG. 2B, or step 314 in FIG. 3, or step 414 in FIG. 4 or step 602 in FIG. 6) the source UPF 240 to forward traffic to the UL CL/BP so that the traffic is steered towards the target UPF 240.

If Information on AF subscription to corresponding SMF events has been provided in the PCC rule, the SMF 204 may take the information in the PCC rule received (e.g. step 232 in FIG. 2B or step 312 in FIG. 3 or step 412 in FIG. 4) from the PCF 206 into account to inform (e.g. steps 504, 506 or step 508 in the case of early notification and/or steps 518, 520 or step 522 in the case of late notification, in FIG. 5) the AF 202 of the (re)selection of the UP path (UP path change). If the information includes an indication of "AF acknowledgment to be expected", the SMF 204 may wait for a response from the AF 202 before the SMF 204 configures, in the case of early notification, or activates, in the case of late notification, the new UP path.

The disclosure will now describe the procedures between the AF 202, the PCF 206 and the SMF 204 to maintain an efficient user plane (UP) path, in accordance with the embodiments described herein. The disclosure and the accompanying figures illustrate how the AF 202 sends the AF request to the PCF 206 and how the AF request is processed by the PCF 206 and impacts the SMF's traffic routing decision. The disclosure and the accompanying figures further illustrate how the SMF 204 notifies the AF 202 about UP path management events, in the case that the AF 202 subscribes to notifications of such events in the AF request.

Processing AF requests to influence traffic routing for Sessions identified by an UE address.

If the AF request is targeting an individual UE (more precisely, a specific on-going PDU Session), e.g. identified by a UE address, the AF request is sent (by the AF 202 or by the NEF 208) to an individual PCF 206 relevant to the PDU Session (e.g. the serving PCF 206 of the PDU Session) using the Binding Support Function (BSF) 320 as illustrated below. Whether the AF 202 needs to use the NEF 208 or not to send the AF request is according to local deployment. The content of the AF request is described above.

Referring to FIG. 3, depending on the AF deployment, the AF 202 may send the AF request to the PCF 206 directly, in which case step 302 is skipped, or via the NEF 208.

In the conditional step 302, when the AF 202 sends the AF request via the NEF 208, the AF 202 sends the AF request targeting an individual UE address to the NEF 208. This request corresponds to an AF request to influence traffic routing that targets an individual UE address. When the NEF 208 receives the AF request from the AF 202, the NEF 208 ensures the necessary authorization control and mapping from the information provided by the AF 202 into information needed by the 5GC, as described earlier in the disclosure. The NEF 208 responds to the AF 202.

In the conditional step 304, the AF 202/NEF 208 sends a request to the BSF 320 to obtain the address of the relevant PCF 206 if the PCF 206 address is not available on the NEF 208 based on local configuration; otherwise step 302 is skipped. The AF 202/NEF 208 may find the BSF 320 based on local configuration or using the Network Repository Function NRF.

In step 306, the BSF 320 may provide/send the PCF's address to the AF 202/NEF 208.

In step 308, if step 302 was performed, the NEF 208 transfers or sends the AF request to the PCF 206; otherwise, the AF 202 sends the AF request directly to the PCF 206. The PCF 206 responds to the AF 202 via step 309 to acknowledge the recipient of the AF request.

In step 310, the PCF 310 generates PCC rules(s) based on the AF request. In step 312, the PCF 206 may update/send the SMF 204 (that is serving the PDU Session) the new PCC rule(s) generated based on the AF request. The SMF 204 may respond, in step 313, to the PCF 206 to acknowledge the receipt of the PCC rule(s). When the PCC rule(s) are received from the PCF 206, via step 312, the SMF 204 may take appropriate actions, when applicable, to (re)configure, via step 314, the UP path of the PDU Session, which may comprise: adding, replacing or removing UPF(s) in the UP path, e.g. to act as UL CL, Branching Point, and/or PDU Session Anchor; allocating a new Prefix to the UE (when IPv6 multi-Homing applies); and updating the UPF regarding the target DNAI with new traffic steering rules.

Processing AF Requests to Influence Traffic Routing for Sessions not Identified by an UE Address Referring to FIG. 4, if the AF request is targeting a group of UE(s), or any UE accessing a combination of DNN and S-NSSAI, or targeting individual UE by a GPSI, the AF 202 shall contact the NEF 208 and the NEF 208 stores the AF request information in the User Data Repository (UDR) 420. PCF(s) 206 receive a corresponding notification from the UDR 420, if they had subscribed to notification of the creation/modification/deletion of the AF request information, and obtains the AF request. This is further described below. Note that the AF request in this case can target on-going or future PDU Sessions. The content of the AF request is described above.

In step 402, the AF 202 creates the AF request. The AF request contains also an AF Transaction Id. In case the AF 202 subscribes to events related with PDU Sessions, the AF 202 indicates also where it desires to receive the corresponding notifications (this is referred to as AF notification reporting information). The AF request may be for updating or removing an existing request (identified by the AF Transaction Id).

In step 404, the AF 202 sends the AF request to the NEF 208. The NEF 208 ensures the necessary authorization control, including throttling of AF requests and mapping from the information provided by the AF 202 into information needed by the 5GC, is performed, as described above and elsewhere herein.

In step 406, if the AF request is a new request or is for updating an existing request, the NEF 208 stores the AF request information or the AF request in the UDR 420. If the AF request is for deleting or removing an existing request, the NEF 208 deletes the corresponding AF request information (e.g. identified using the AF Transaction Id in the AF request) in the UDR 420. In step 408, the NEF 208 may then respond to the AF 202.

In step 410, the UDR 420 notifies the PCFs 206 about the AF request if the PCF(s) 206 have subscribed to notifications of data change related to the AF request from the UDR 420. The PCF(s) 206 receives the AF request in this step.

In step 412, the PCF 206 determines if existing PDU Sessions are potentially impacted by the AF request. For each of the impacted PDU Sessions, the PCF 206 updates the SMF 204 (i.e. the SMF 204 serving the PDU Session) with or sends the SMF 204 new PCC rule(s), which are generated by the PCF 206 based on the AF request. The SMF 204 may respond, in step 413, to the PCF 206 to acknowledge the receipt of the PCC rule(s).

In step 414, when the PCC rule(s) are received from the PCF 206, the SMF 204 may take appropriate actions to (re)configure the UP path of the PDU Session by doing at least one of the following: adding, replacing or removing a UPF 240 in the UP path to e.g. act as an UL CL or a Branching Point; allocating a new Prefix to the UE (when IPv6 multi-Homing applies); updating the UPF 240 in the target DNAI with new traffic steering rules The disclosure will now describe the procedure for Notification of User Plane Management Events.

Referring to FIG. 5, the SMF 204 may send a notification to the AF 202 if the AF 202 has subscribed to notifications of user plane or user plane path management event using the AF request, as described above herein. The following are the examples of such events: a PDU Session Anchor identified in the AF subscription request has been established or released; a DNAI has changed; the SMF 204 has received a request (as information on the AF subscription (to SMF events) in a PCC rule received from the PCF 206, as described above herein, e.g. step 312 in FIG. 3 or step 412 in FIG. 4) for notifications of user plane or user plane path management events and the on-going PDU Session meets the conditions to notify the AF 202. The content of the notification is described above herein.

The SMF 204 sends the notification to the AF 202, depending on the subscription type (which may include one or both of early and late notification), via the NEF 208 (steps 504, 506 and/or steps 518, 520) or directly (step 508 and/or step 522), as illustrated in FIG. 5 and described below.

In step 502, a UP management event (e.g. an event described above) occurs for the PDU Session.

In steps 504, 506, or in step 508, if the AF 202 has subscribed to early notifications of the event, the SMF 204 sends a notification about the event to the AF 202. The SMF 204 may include the target DNAI of the PDU Session in the notification.

The AF 202 may reply, in step 510 and 512 via the NEF 208 or directly in step 514, to the notification by sending a response to the SMF 204, which may be positive response or a negative response. The AF 202 may include N6 traffic routing details corresponding to the target DNAI (indicated in the notification) in the response if the response is a positive response.

If the AF request including information on the AF subscription was sent to the PCF 206 via the NEF 208, the SMF sends the notification about the event to the AF 202 via the NEF 208 (steps 504 and 506). After receiving the notification from the SMF 204, the NEF 208 may perform information mapping on the notification before sending the notification to the AF 202, as described above and elsewhere herein. In this case, the AF 202 sends the response to the SMF 204 via the NEF 208 (steps 510 and 512) too.

If the AF request including information on the AF subscription was sent to the PCF 206 directly, without via the NEF 208 the SMF 204 sends the notification about the event to the AF 202 directly (step 508). In this case, the AF 202 sends to the response to the SMF 204 directly (step 514), without via the NEF 208 too.

In step 516, the SMF (re)configures the UP path, e.g. enforcing the change of DNAI or addition, change, or removal of a UPF. This step is similar to step 234 in FIG. 2B or step 314 in FIG. 3, or step 414 in FIG. 4 or step 602 in FIG. 6.

According to the indication of "AF acknowledgment to be expected" included in the AF subscription to SMF events in the PCC rule received from the PCF (e.g. in step 312 in FIG. 3 or step 412 in FIG. 4), the SMF 204 may wait for the response from the AF 202 to the early notification before this step. The SMF 204 does not perform this step until it receives a positive response from the AF 202.

If the AF 202 has subscribed to late notification of the event, the SMF 204 sends a notification of the event to the AF 202. The SMF 204 may include the target DNAI of the PDU Session in the notification. The AF 202 may reply to the notification by sending a response to the SMF 204, which may be positive response or a negative response. The AF 202 may include N6 traffic routing details corresponding to the target DNAI (indicated in the notification) in the response if the response is a positive response.

If the AF request including information on the AF subscription was sent to the PCF 206 via the NEF 208, the SMF 204 sends the notification about the event to the AF 202 via the NEF 208 (steps 518 and 520). After receiving the notification from the SMF 204, the NEF 208 may perform information mapping on the notification before sending the notification to the AF 202, as described above and elsewhere herein. In this case, the AF 202 sends to the response to the SMF 204 via the NEF 208 (steps 524 and 526) as well.

If the AF request including information on the AF subscription was sent to the PCF 206 directly, without via the NEF 208, the SMF 204 sends the notification about the event to the AF 202 directly (step 522). In this case, the AF 202 sends the response to the SMF 204 directly (step 528), without via the NEF 208 too.

The enhancements to the above described procedure, to support the scenarios (i.e. service function chain, selective traffic steering, application server discovery as discussed above herein) will now be described.

The enhancements are to the AF request, the PCC rule (generated based on the AF request) and the behavior of the SMF 204 and the UPF 240 in above described procedures. The architecture and the procedures, as described above, remains unchanged.

It should be noted that although the enhancements may be described separately, they can be used in combination.

In the enhancements, the traffic refers to the traffic identified in the AF request, e.g. by the information to identify the traffic in the AF request. The traffic may be a traffic flow composed of a sequence of packets or PDUs (Protocol Data Units). We use packet and PDU interchangeably.

Enhancement for the Support of service function chain and additional information elements in AF request will now be discussed.

As an enhancement, the AF 202 may provide some information elements in the AF request sent to the PCF 206 (e.g. via steps 402, 404, 406, 410 in FIG. 4; or via steps 302, 308 in FIG. 3), in addition to those described above, and/or may provide enhanced information elements in the AF request, i.e. some information elements described above being enhanced.

As an enhancement, in the AF request sent to the PCF 206, AF 202 may provide information indicating that the traffic should be routed through some functions such as DPFs (which may be a network function or an application-layer function, as described above with reference to service function chain) in a particular order. The information is referred to as service function chain information.

The service function chain information may be expressed as an order listed of DNAI sets, each set representing a function, DPF, and including a list of DNAIs representing the potential locations of the function, DPF. The order of the DNAI sets, in the list, implies the order in which the traffic should be routed through the corresponding functions, DPFs for example, referring to FIG. 2B, the order may be DPF 226 and DPF 228.

For ease of presentation, the ordered list of DNAI sets (i.e. functions, DPF(s)) is referred to as service function chain and may include only one DNAI set (i.e. function, DPF 226) or more than one DNAI set, e.g. 2 DPF(s), 226, 228 as shown in FIG. 2B.

In the AF request, the information indicating potential locations of applications towards which the traffic routing should apply (which is described above) can be expressed by or in the form of service function chain information. Thus, the service function chain information is an enhanced form or way of expressing the information indicating potential locations of applications towards which the traffic routing should apply. In this case, if the information about N6 traffic routing requirements in the AF request includes an indication of traffic correlation (as described above), it implies the targeted PDU Sessions should be correlated by a common DNAI on per DPF basis for the traffic identified in the request. That is, if this indication is provided by the AF 202, the 5GC (e.g. the SMF 204) should select a common DNAI from the list of DNAI(s) in each DNAI set (i.e. for each DPF in the service function chain) for the target PDU Sessions. Also, in this case, the information about N6 traffic routing requirements in the AF request may be provided on a per DNAI per DPF basis.

As an enhancement, in the AF request sent to the PCF 206, the AF 202 may further provide information indicating that the traffic should be routed to the final destination 218 (as indicated in the packet header) after being routed through the service function chain 216 (i.e. the functions, DPF(s), in the particular order). The information is referred to as final delivery indication.

PCC Rule Generated Based on AF Request.

The PCF 206 may include the information described above, i.e. service function chain information and final delivery indication, together with other information in the AF request (as described) in the PCC rule(s) that are generated based on the AF request and sent (e.g. via step 232 in FIG. 2 or via step 412 in FIG. 4 or via step 312 in FIG. 3) to the SMF 204. The SMF 204 enforces the PCC rules received from the PCF 206 on a relevant PDU Session, e.g. a PDU Session that is used to route the traffic and is served by the SMF 204.

The SMF 204 and UPF 240 Behaviour.

When enforcing the PCC rules, according to the information in the PCC rules, the SMF 204 selects a location for each individual function, DPF, in the service function chain and UPF(s) 240 (e.g. PSAs) for the PDU Session and configures (e.g. via step 234 in FIG. 2B, or step 314 in FIG. 3 or step 414 in FIG. 4 or step 602 in FIG. 6) the UPF(s) 240 to route the traffic through the selected function locations in the order of the respective functions in the service function chain. When configuring the UPF(s) 240, the SMF 204 may generate or construct PDRs and/or FARs according to the information (e.g. the service function chain information, the final delivery indication, the per-DNAI N6 traffic routing requirements, the information to identify the traffic) in the PCC rules and provide the PDRs and FARs to the UPF(s) 240. The UPF(s) 240 then uses the PDRs and/or FARs received from the SMF 204 to route the traffic through selected function locations in the order of the respective functions in the service function chain. It is possible that the SMF 204 selects the same location for some, or all of the functions in the service function chain. If the PCC rules are related to a 5G VN group (i.e. a UE group) served by the SMF 204 and if the information about the N6 traffic routing requirements in the PCC rules includes an indication of traffic correlation, the SMF 204 should select a common DNAI from the list of DNAI(s) in each DNAI set (i.e. for each DPF in the service function chain) for the PDU Sessions of the 5G VN group. Then, the SMF 204 (re) configures the UPF(s) 240, as described below in accordance with FIG. 6.

Figure 6:
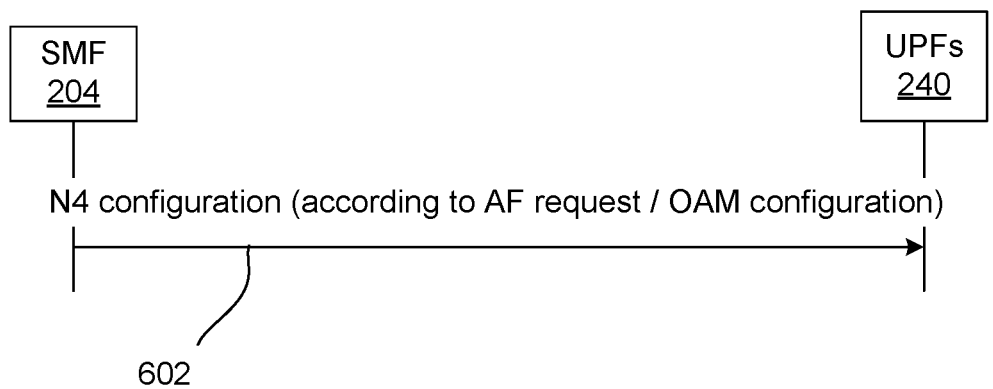
FIG. 6 is a call flow diagram illustrating an SMF configuring user plane functions to enable the traffic steering control service requirements, according to an embodiment of the present disclosure.

FIG. 6 is a call flow diagram illustrating an SMF 204 configuring (step 602) user plane functions 240, e.g. by sending or providing PDRs and FARs to the user plane functions, to enable the traffic steering control service requirements, according to an embodiment of the present disclosure. It can be integrated within FIG. 3 as (part of) step 314. It can be integrated within FIG. 4 as (part of) step 414 or within FIG. 2B as (part of) step 234.

Figure 8:
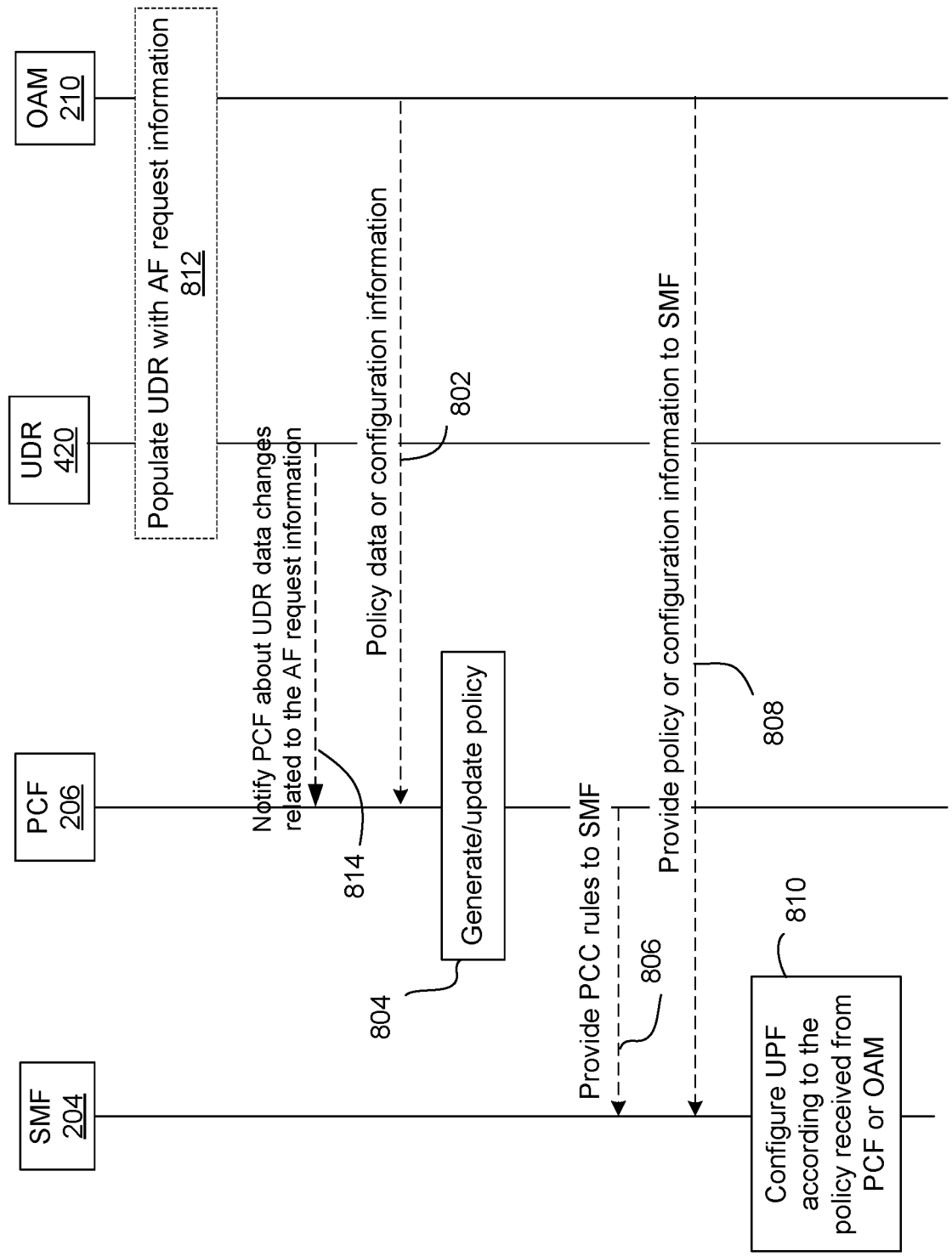
FIG. 8 is a call flow diagram illustration of steering traffic via a network operation administration and maintenance (OAM) system, according to an embodiment of the present disclosure.

It should be noted that in this disclosure, step 602 in FIG. 6 may be similar, the same, or part of the step 234 in FIG. 2B, step 314 in FIG. 3, step 414 in FIG. 4, and step 810 in FIG. 8. In other words, these steps (step 602 in FIG. 6, step 234 in FIG. 2B, step 314 in FIG. 3, step 414 in FIG. 4, and step 810 in FIG. 8) may be similar or the same as each other, as understood by an ordinary person skilled in the art. Similarly, step 232 in FIG. 2B, step 312 in FIG. 3, step 412 in FIG. 4, and step 806 in FIG. 8 may be similar or the same as each other, as understood by an ordinary person skilled in the art. Similarly, step 310 in FIG. 3, step 412 (the part related to PCC rule generation) in FIG. 4, and step 804 in FIG. 8 may be similar or the same as each other, as understood by an ordinary person skilled in the art.

Considering a first DPF, for example DPF 226, in the service function chain 216. There are two cases as elaborated below.

The first case may be when the first DPF is not the last function in the service function chain 216 (as indicated by the service function chain information in the PCC rule(s)) or when the PCC rule (e.g. the PCC rule being received 232 or 312 or 412 or 806 from the PCF 206, as described in embodiments with reference to FIGS. 2B, 3, 4 and 8) indicates that the traffic should be routed to the final destination 218 (e.g. by including the final delivery indication).

In this case, the SMF 204 may select and configure (e.g. via step 234 in FIG. 2B, step 314 in FIG. 3, step 414 in FIG. 4, and step 602 in FIG. 6) a first UPF 220 and a second UPF 222 such that the first UPF routes the traffic to the first DPF 226 (i.e. to the location of the first function, the location being selected by the SMF 204) and a second UPF 222 receives the traffic back from the first DPF 226.

The first UPF 220 and the second UPF 222 may be the same UPF. The first UPF 220, the second UPF 222 and the location of the first DPF 226 may be selected by the SMF 204 together jointly for user plane efficiency.

When configuring the first UPF 220 and the second UPF 222 (e.g. via step 234 in FIG. 2B, step 314 in FIG. 3, step 414 in FIG. 4, and step 602 in FIG. 6), the SMF 204 may generate or construct packet detection rules (PDRs) using the information (e.g. information to identify the traffic) in the PCC rules (e.g. received from the PCF via step 412 in FIG. 4, via step 312 in FIG. 3, or via step 232 in FIG. 2B, or via step 806 in FIG. 8) and configures the rules into, or provide the rules to the two UPFs 220, 222 (and/or UPF 224). The first UPF 220 uses its PDR to detect the traffic before the traffic is being routed to the first DPF 226; the second UPF 222 uses its PDR to detect the traffic after the traffic is being routed through the first DPF 226. The PDR configured into the first UPF 220 may be different from that configured into the second UPF 222. The latter may be generated or constructed by the SMF 204 additionally according to information on the connection/interface between the selected location of the first DPF 226 and the second UPF 222.

When configuring the first UPF 220 (e.g. via step 234 in FIG. 2B, step 314 in FIG. 3, step 414 in FIG. 4, and step 602 in FIG. 6), the SMF 204 may also generate or construct forwarding action rules (FARs) using the information (e.g. per-DNAI N6 traffic routing information or requirement) in the PCC rule(s) (e.g. received from the PCF 206 via step 412 in FIG. 4, via step 312 in FIG. 3, or via step 232 in FIG. 2B) and configure the FARs into, or provide the FARs to the first UPF 220. The FAR is linked or associated to the PDR configured in the first UPF 220. After the first UPF 220 detects the traffic using the PDR, the UPF 220 uses the FAR (linked or associated to the PDR) to route the traffic to the selected location of the first DPF 226. The FAR may be generated or constructed by the SMF 204 using or according to the N6 traffic routing requirements related to that function location (expressed in the form of DNAI) in the PCC rule(s).

After the first DPF 226 (at the selected location) receives the traffic, the first DPF 226 routes, sends or forwards the traffic (after possible processing) to the second UPF 222. In this case, the traffic is routed, sent or forwarded by the first DPF 226 as UL traffic. The first DPF 226 therefore needs to know N6 information about how to route, send or forward the traffic as UL traffic. The first DPF 226 may get the knowledge or the information from the AF 202, which may in turn get it from the SMF 204. For example, when notifying (e.g. via steps 504/506 or 508 or 518/520 or 522 in FIG. 5) the AF 202 about UP path management/change events (e.g. DNAI change or selection regarding the DPF 226) the SMF 202 may include N6 traffic routing information for sending UL traffic in the notification. This information may include protocol ID, tunnel ID, tunnel end point ID, address, port number related to the second UPF side of the connection between the first function (precisely, the selected location of the first DPF 226) and the second UPF 222. After receiving the information from the SMF 204, the AF 202 may provide or send (e.g. via step 260 in FIG. 2B) it to the first DPF 226, which then uses it to route, send or forward the traffic to the second UPF 222 as UL traffic.

As the notification sent (e.g. via steps 504/506 or 508 and/or 518/520 or 522 in FIG. 5) from the SMF 204 to the AF 202 about UP path management/change events may include N6 traffic routing formation related to the first UPF 220 (the N6 traffic routing information being used for routing/sending DL traffic toward the UE, as described above; in this case it is to be used by the first DPF 226 to send DL traffic), the SMF 204 may associate each of these two types/pieces of N6 traffic routing information (i.e. N6 traffic routing information for sending DL traffic and N6 traffic routing information for sending UL traffic) with an indication in the notification, indicating whether the information is to be used for sending DL traffic or for sending/ forwarding/routing UL traffic. When the first UPF 220 and the second UPF 222 are the same UPF, the two types/pieces of N6 traffic routing information may correspond to two connections between the UPF and the first DPF 226 at the selected location (i.e. the location being selected by the SMF 204 for the first DPF 226 among the potential locations provided by the AF 202 in the AF request).

Note that, because the service function chain 216 may include more than one DPFs, the notification sent (e.g. via steps 504/506 or 508 and/or 518/520 or 522 in FIG. 5) from the SMF 204 to the AF 202 may include information identifying the DPF that the DNAI change or selection (e.g. the source DNAI, the target DNAI) and associated information (N6 traffic routing information for sending UL traffic, N6 traffic routing information for sending DL traffic) indicated in the notification is for or related to. The information identifying the DPF may be in the form of a function index, indicating the position of the DPF in the ordered list of DNAI sets (specified by the service function chain information, which is described above). The AF 202 can according to this information in the notification identify the corresponding DPF, and provide the N6 traffic routing information (for sending UL traffic and/or for sending DL traffic) to the DPF at the location represented or identified by the target DNAI.

Note that, because the SMF 204 sends such notifications to the AF 202 based on AF subscription to the corresponding events, in the AF request the AF 202 should indicate AF subscription to notifications of UP path management/change events (e.g. steps 402, 404 in FIG. 4; steps 302, 308 in FIG. 3; or step 230 in FIG. 2B).

The second case may be when the first DPF 226/228 is the last function in the service function chain 216 (as indicated by the service function chain information in the PCC rule(s)) and when the PCC rule does not indicates that the traffic should be routed to the final destination 208 (e.g. by not including the final delivery indication).

The SMF 204 may select and configure (e.g. by sending PDRs and/or FARs, via step 234 in FIG. 2B, step 414 in FIG. 4, and step 602 in FIG. 6) a UPF 240 such that the UPF 240 routes the traffic (according to the PDRs and FARs) to the first DPF 226 (to the location of the first DPF 226 selected by the SMF 204). In this case, the first DPF 226 does not route the traffic back to the 3GPP network, and no second UPF 222 is selected and configured to receive the traffic back from the first DPF 226.

Enhancement for the Support of selective traffic steering and additional information elements in AF request.

As an enhancement, the AF 202 may provide some information elements in the AF request sent to the PCF 206 (e.g. via steps 402, 404, 406, 410 in FIG. 4; or via steps 302, 308 in FIG. 3), in addition to those described above herein.

In the AF request sent to the PCF 206, the AF 202 may include information on selective traffic steering. The information indicates that packets of the traffic should be selectively steered or routed to a service function chain 216 specified in the AF request. During selective traffic steering, some packets of the traffic is selected to steer or route to the service function chain 216. In some embodiments, selective traffic steering is performed in parallel to the normal traffic routing. That is, while the traffic is being routed to the final destination as indicated in the packet header, some packets of the traffic is selected to be duplicated and steered or routed (step 214 in FIG. 2B) to the service function chain 216 (the duplicate packets are steered and routed to the service function 216). In some embodiments, when duplicating the packets, only the packet headers are duplicated, and in this case, the payload field of a duplicate packet may be empty or filled or padded with random or meaningless content or content irrelevant to the content in the payload field of the original packet.

The information on selective traffic steering may indicate how to select packets (for being routed or steered to the service function chain 216 or for being duplicated and routed or steered to the service function chain 216) in the traffic. For example, information on selective traffic steering may indicate to select all packets, to select packets randomly, or to select packets using some parameter(s) associated to the information on selective traffic steering. The associated parameters may indicate or specify to select a packet every certain number (in this case, the parameter(s) specify the number) of packets or a packet at some time windows or intervals (in this case, the parameter(s) specify the window length or interval length in certain time unit like second, minute, hour, etc.). In some embodiments, the associated parameter(s) may be included in the information on selective traffic steering. In some embodiments, the associated parameter(s) may be included in an information element separate from the information on selective traffic steering.

PCC Rule Generated Based on AF Request.

The PCF 206 includes the information on selective traffic steering and the parameters associated to it (if any) together with other information in the AF request (as described above herein) in the PCC rules that are generated based on the AF request and sent (e.g. via step 412 in FIG. 4 or via step 312 in FIG. 3; or step 232 in FIG. 2B; or via step 806 in FIG. 8) to the SMF 204.

SMF and UPF Behaviour According to an Embodiment of the Present Disclosure

According to the information on selective traffic steering and the parameters associated to it (if any) in the PCC rules received from the PCF 206, the SMF 204 configures (e.g. via step 314 in FIG. 3; via step 414 in FIG. 4; via step 602 in FIG. 6; or via step 234 in FIG. 2B; or via step 810 in FIG. 8) the UPF(s) 240 to perform selective traffic steering for the traffic toward or to the service function chain 216 (e.g. the first DPF 226 of the chain). The SMF 204 may not configure the UPF 240 to perform selective traffic steering for the traffic that has already been routed through the service function chain 216 fully (i.e. through all the DPF(s) in the chain) or partially (i.e. through some DPF(s) in the chain, but not yet through the other DPF(s) in the chain). Based on the configuration by the SMF 204, the UPF 240 performs selective traffic steering for the traffic, i.e. selecting packets, duplicating the selected packets or headers of the selected packets, steering or routing the duplicated packets or packet headers to the service function chain (i.e. UPF 220 via step 214 to DPF 226). Afterward, the duplicated packets or packet headers are routed through the complete service function chain 216 with assistance from UPFs 240 according to the configuration by the SMF 204 for support of service function chain, as described above herein.

When configuring the UPF (e.g. via step 314 in FIG. 3; via step 414 in FIG. 4; via step 602 in FIG. 6; or via step 234 in FIG. 2B; or via step 810 in FIG. 8) to perform selective traffic steering, the SMF 204 may generate or construct packet detection rule(s), PDR(s), and packet forwarding action rule(s), FAR(s), using the information (e.g. information to identify the traffic for generating PDR(s); N6 traffic routing requirements related to the selected location of the first DPF 226 in the service function chain 216 for generating FAR(s); information on selective traffic steering (and the parameters associated to it, if any) for generating PDR(s) or FAR(s)) in the PCC rules received from the PCF 206 (e.g. via step 412 in FIG. 4; via step 312 in FIG. 3; or via step 232 in FIG. 2B; or via step 806 in FIG. 8) and configures the PDR(s) and the FAR(s) into, or provides the PDR(s) and the FAR(s) to the UPFs 240. The SMF 204 may link or associate the FAR(s) to the PDR(s). When linking or associating an FAR to a PDR, the SMF 204 may include the identifier of the FAR in the PDR. The UPF 240 may use the PDR(s) and the FAR(s) to perform selective traffic steering. For example, the SMF 204 may use the PDR(s) to detect the traffic that has not yet been routed through any DPF in the service function chain, and then use the FAR(s) (which is/are associated/linked to the PDR(s)) to route packets selected from the traffic to the first DPF 226 of the service function chain 216.

To support the UPF 240 to perform selective traffic steering (in particular, selecting packets from the traffic), the PDR or the FAR provided by the SMF 204 to, or configured by the SMF 204 into the UPF 240 may be enhanced as described below.

The PDR may be enhanced to support selective traffic steering.

The PDR can be enhanced to include information about traffic selection (e.g. as indicated by the field or attribute of packet (PDU) selection strategy in the enhanced format of PDR described below) and to be linked or associated to multiple FARs (e.g. a first FAR, as indicated by the field or attribute of forwarding action rule ID in the enhanced format of FAR described below, and a second FAR, as indicated by the field or attribute of second forwarding action rule ID in the enhanced format of FAR described below), in support of selective traffic steering routing. That is, when generating or constructing the PDR to be configured into (or provided to) the UPF 240 (e.g. step 314 in FIG. 3; via step 414 in FIG. 4; via step 602 in FIG. 6; or via step 234 in FIG. 2B; or via step 810 in FIG. 8) the SMF 204 may include information about traffic selection in the PDR and link or associate to multiple FARs (e.g. a first FAR and a second FAR) to the PDR. The information about traffic selection may be identical or related to (or derived by the SMF 204 from) the information on selective traffic steering (and the parameters associated to it, if any) in the PCC rule received from the PCF 206 (e.g. via step 412 in FIG. 4; via step 312 in FIG. 3; or via step 232 in FIG. 2B; or via step 806 in FIG. 8) that the SMF 204 may use to generate or construct the PDR.

In some embodiments, the information about traffic selection is included in the PDR and the PDR is linked or associated to multiple FARs only if the PDR contains information indicating the packet (if matching or satisfying the PDR) is coming from the RAN or from the core network, e.g. when the source interface field or attribute of the PDR is set to contain information such as 'access side' or 'core side'.

Attributes within an Embodiment of the Enhanced Packet Detection Rule:

| Attribute | | Description | Comment |
|---|---|---|---|
| N4 Session ID | | Identifies the N4 session associated to this PDR | |
| Rule ID | | Unique identifier to identify this rule | |
| Precedence | | Determines the order, in which the detection information of all rules is applied | |
| Packet detection information | Source interface | Contains the values "access side", "core side", "SMF", "N6-LAN", "5G LAN internal", "5G LAN Nx" | Combination of UE IP address (together with Network instance, if necessary), CN tunnel info, packet filter set, application ID, Ethernet PDU Session Information and QFI are used for traffic detection. Source interface identifies the interface for incoming packets where the PDR applies, e.g. from access side (i.e. up-link), from core side (i.e. down-link), from SMF, from N6-LAN (i.e. the DN or the local DN), from "5G LAN internal" (i.e. local switch), or from "5G LAN Nx" (i.e. Nx interface). Details like all the combination possibilities on N3, N9 interfaces are left for stage 3 decision. |
| | Traffic Direction | Contains the values "downlink", "uplink", etc. | |
| | UE IP address | One IPv4 address and/or one IPv6 prefix with prefix length (NOTE 3) | |
| | Network instance (NOTE 1) | Identifies the Network instance associated with the incoming packet | |
| | CN tunnel info | CN tunnel info on N3, N9 interfaces, i.e. F-TEID | |
| | Packet Filter Set | Details see clause 5.7.6, TS 23.501. | |
| | Application ID | | |
| | QOS Flow ID | Contains the value of 5QI or non-standardized QFI | |
| | Ethernet PDU Session Information | Refers to all the (DL) Ethernet packets matching an Ethernet PDU session, as further described in clause 5.6.10.2 and in TS 29.244 [65]. | |
| | Framed Route Information | Refers to Framed Routes defined in clause 5.6.14 | |
| Outer header removal | | Instructs the UP function to remove one or more outer header(s) (e.g. IP + UDP + GTP, IP + possibly UDP, VLAN tag), from the incoming packet. | Any extension header shall be stored for this packet. |

-continued

| Attribute | Description | Comment |
|---|---|---|
| Forwarding Action Rule ID (NOTE 2) | The Forwarding Action Rule ID identifies a forwarding action that has to be applied. This is the first forwarding action rule. | |
| Second Forwarding Action Rule ID | The Second Forwarding Action Rule ID identifies a forwarding action that is to be taken in support of selective traffic steering. | |
| Packet (PDU) selection strategy | This is the information about traffic selection. It includes associated parameters. | |
| Multi-Access Rule ID (NOTE 2) | The Multi-Access Rule ID identifies an action to be applied for handling forwarding for a MA PDU Session. | |
| List of Usage Reporting Rule ID(s) | Every Usage Reporting Rule ID identifies a measurement action that has to be applied. | |
| List of QoS Enforcement Rule ID(s) | Every QOS Enforcement Rule ID identifies a QoS enforcement action that has to be applied. | |

NOTE 1:
Needed e.g. in case:
UPF supports multiple DNN with overlapping IP addresses;
UPF is connected to other UPF or AN node in different IP domains.
UPF "local switch" and Nx forwarding is used for different 5G LAN groups.
NOTE 2:
Either a FAR ID or a MAR ID is included, not both.
NOTE 3:
The SMF may provide an indication asking the UPF to allocate one IPv4 address and/or IPv6 prefix. When asking to provide an IPv6 Prefix the SMF provides also an IPv6 prefix length.

Embodiments provide an enhancement to the format of the PDR defined in the 3GPP standards, for example clause 5.8.2.11.3, 3GPP TS 23.501V16.1.0. Some embodiments include an enhancement to the PDR which includes fields or attributes used by the network functions for packet (PDU) selection strategy (for indicating how to select traffic to route to a service function chain). Some embodiments include a second forwarding action rule ID, which identifies or refers to a forwarding action that is to be taken by the UPF(s) in order to route traffic toward the service function chain (when selective traffic steering applies, e.g. as indicated by the packet (PDU) selection strategy). In some embodiments, the enhancement includes the field or attribute of the forwarding action rule ID for being re-used to identify or refer to a forwarding action that is to be taken by the UPF in order to route traffic toward the final destination.

For a packet that matches or satisfies the PDR, the UPF 240 may perform selective traffic steering under the following condition: the PDR indicates that the packet is received or coming from the RAN or the core network (e.g. the source interface field or attribute of the PDR containing information, e.g. 'access side' or 'core side'); the PDR is associated or linked to a second FAR in addition to a first FAR, where the first FAR is to be used to route traffic toward the final destination (as indicated in the packet header) rather than the service function chain and the second FAR is to be used to route traffic toward the service function chain; and the PDR includes information about traffic selection.

When performing selective traffic steering, the UPF 240 determines whether to select the packet (or selects the packet) according to the information about traffic selection, e.g. according to the following logic: if the information about traffic selection indicates to select all packets, the UPF 240 determines to select (or selects) the packet; if the information about traffic selection indicates to select packets randomly, the UPF 240 makes a random decision on selecting the packet (or, selects the packet following a random decision on selecting the packet); if the information about traffic selection indicates to select a packet every certain number packets, say 'x', the UPF 240 determines to select (or selects) the packet if the last 'x' successive packets in the traffic were not selected, the number 'x' being a parameter associated to or as part of the information about traffic selection; if the information about traffic selection indicates to select a packet every certain time window or interval along with a window or interval length or specific ending time of the time window or interval, the UPF 240 determines to select (or selects) the packet if it is at the end of the time window or interval.

If the UPF 240 determines to select the packet or if the packet is selected by the UPF 240, the UPF 240 may then duplicate the packet or packet header and route the duplicated packet or packet header using the second forwarding action rule, which causes the duplicated packet or packet header to be routed toward the service function chain 216. The UPF 240 may not do so if the UPF 240 determines not to select the packet or if the packet is not selected by the UPF 240.

In some embodiment, whether the packet is selected by the UPF 240 or not, the UPF 240 may route the packet using the first forwarding action rule linked or associated to the PDR, which may cause the packet to be routed toward the final destination 218 as indicated in the packet header. In some embodiments, the UP may route the packet using the first forwarding action rule only if the UPF 240 determines not to select the packet or only if the packet is not selected by the UPF 240.

The FAR may be enhanced to support selective routing.

Attributes within an embodiment of the enhanced Forwarding Action Rule.

| Attribute | Description | Comment |
| --- | --- | --- |
| N4 Session ID | Identifies the N4 session associated to this FAR. | |
| Rule ID | Unique identifier to identify this information. | |
| Action | Identifies the action to apply to the packet | Indicates whether the packet is to be forwarded, duplicated, dropped or buffered.<br>When action indicates forwarding or duplicating, a number of additional attributes are included in the FAR.<br>For buffering action, a Buffer Action Rule is also included. |
| Network instance (NOTE 2) | Identifies the Network instance associated with the outgoing packet (NOTE 1). | |
| Destination interface (NOTE 3) (NOTE 7) | Contains the values "access side", "core side", "SMF", "N6-LAN", "5G LAN internal" or "5G LAN Nx". | Identifies the interface for outgoing packets towards the access side (i.e. down-link), the core side (i.e. up-link), the SMF, the N6-LAN (i.e. the DN or the local DN), to 5G LAN internal (i.e. local switch), or to 5G LAN Nx (i.e. Nx interface). |
| Outer header creation (NOTE 3) | Instructs the UP function to add an outer header (e.g. IP + UDP + GTP + QFI, VLAN tag), IP + possibly UDP to the outgoing packet. | Contains the CN tunnel info, N6 tunnel info or AN tunnel info of peer entity (e.g. NG-RAN, another UPF, SMF, local access to a DN represented by a DNAI).<br>Any extension header stored for this packet shall be added. |
| Send end marker packet(s) (NOTE 2) | Instructs the UPF to construct end marker packet(s) and send them out as described in clause 5.8.1. | This parameter should be sent together with the "outer header creation" parameter of the new CN tunnel info. |
| Transport level marking (NOTE 3) | Transport level packet marking in the uplink and downlink, e.g. setting the DiffServ Code Point. | |
| Forwarding policies list (NOTE 3) | Reference to a list of preconfigured traffic steering policies or http redirection (NOTE 4). | Contains one of the following policies identified by a TSP ID: an N6-LAN steering policy to steer the subscriber's traffic to the appropriate N6 service functions deployed by the operator, or a local N6 steering policy to enable traffic steering in the local access to the DN according to the routing information provided by an AF as described in clause 5.6.7.<br>or a Redirect Destination and values for the forwarding behaviour (always, after measurement report (for termination action "redirect")). |
| Packet (PDU) selection strategy | This is information about traffic selection. It includes associated parameters | |
| Request for Proxying in UPF | Indicates that the UPF shall perform ARP proxying and/or IPv6 Neighbour Solicitation Proxying as specified in clause 5.6.10.2. | Applies to the Ethernet PDU Session type. |

-continued

| Attribute | Description | Comment |
| --- | --- | --- |
| Container for header enrichment (NOTE 2) | Contains information to be used by the UPF for header enrichment. | Only relevant for the uplink direction. |
| Buffering Action Rule (NOTE 5) | Reference to a Buffering Action Rule ID defining the buffering instructions to be applied by the UPF (NOTE 6) | |

NOTE 1:
Needed e.g. in case:
UPF supports multiple DNN with overlapping IP addresses;
UPF is connected to other UPF or NG-RAN node in different IP domains;
UPF "local switch" and Nx forwarding is used for different 5G LAN groups.
NOTE 2:
These attributes are required for FAR action set to forwarding.
NOTE 3:
These attributes are required for FAR action set to forwarding or duplicating.
NOTE 4:
The TSP ID is preconfigured in the SMF, and included in the FAR according to the description in clauses 5.6.7 and 6.1.3.14 of 23.503 for local N6 steering and 6.1.3.14 of 23.503 for N6-LAN steering. The TSP ID action is enforced before the Outer header creation actions.
NOTE 5:
This attribute is present for FAR action set to buffering.
NOTE 6:
The buffering action rule is created by the SMF and associated with the FAR in order to apply a specific buffering behaviour for DL packets requested to be buffered, as described in clause 5.8.3 and clause 5.2.4 in TS 29.244.
NOTE 7:
The use of "5G LAN Internal" instructs the UPF to send the packet back for another round of ingress processing using the active PDRs pertaining to another N4 session of the same 5G LAN. To avoid that the packet matches again the same PDR, it is assumed that the packet has been modified in some way (e.g. tunnel header has been removed, the packets being received from the source interface 5G LAN Internal of the same 5G LAN).

Embodiments provide an enhancement to the format of FAR defined in in the 3GPP standards, for example clause 5.8.2.11.6, 3GPP TS 23.501V16.1.0. Some embodiments include an enhancement to the FAR which includes the fields or attributes of packet (PDU) selection strategy. In some embodiments, such an enhanced FAR, the field or attributes of forwarding policy list is reused to indicate a first forwarding/steering policy (for routing toward the final destination) and a second forwarding/steering policy (for routing toward the service function chain).

When the PDR is linked or associated with a single FAR, the FAR can be enhanced to include information about traffic selection and information about multiple forwarding or steering policies, in support of selective traffic steering. That is, when generating or constructing the FAR to be configured into the UPF 240 (e.g. via step 314 in FIG. 3; via step 414 in FIG. 4; via step 602 in FIG. 6; or via step 234 in FIG. 2B; or via step 810 in FIG. 8) the SMF 204 may include information about traffic selection (e.g. as indicated by the field or attribute of packet (PDU) selection strategy in the enhanced format of FAR described above) and information about multiple forwarding or steering policies (e.g. a first forwarding/steering policy and a second forwarding/steering policy, as indicated by the field or attribute of forwarding policy list in the enhanced format of FAR described above), such as the corresponding policy IDs, in the FAR. The information about traffic selection may be identical or related to (or derived by the SMF 204 from) the information on selective traffic steering and the parameters associated to it (if any) in the PCC rule (e.g. received from the PCF via step 412 in FIG. 4; via step 312 in FIG. 3; or via step 232 in FIG. 2B; or via step 806 in FIG. 8) that the SMF 204 may use to generate or construct the FAR.

When performing selective traffic steering using the FAR, the UPF 240 determines whether to select the packet (or selects the packet) according to the information about traffic selection in the FAR, e.g. according to the following the logic: if the information about traffic selection indicates to select all packets, the UPF 240 determines to select (or selects) the packet; if the information about traffic selection indicates to select packets randomly, the UPF 240 makes a random decision on selecting the packet (or, selects the packet following a random decision on selecting the packet); if the information about traffic selection indicates to select a packet every certain number packets, say 'x', the UPF 240 determines to select (or selects) the packet if the last 'x' successive packets in the traffic were not selected, the number 'x' being a parameter associated to or as part of the information about traffic selection; if the information about traffic selection indicates to select a packet every certain time window or interval along with a window or interval length or specific ending time of the time window or interval, the UPF 240 determines to select (or selects) the packet if it is at the end of the time window or interval.

If the UPF 240 determines to select the packet or if the packet is selected by the UPF 240, the UPF 240 may then duplicate the packet or packet header and route the duplicated packet or packet header using or according to the second forwarding/steering policy as indicated (e.g. by the policy ID) in the FAR, which causes the duplicated packet or packet header to be routed toward the service function chain 216. The UPF 240 may not do so if the UPF determines not to select the packet or if the packet is not selected by the UPF 240.

In some embodiment, whether the packet is selected by the UPF 240 or not, the UPF 240 may route the packet using or according to the first forwarding policy indicated (e.g. by the policy ID) in the FAR, which may cause the packet to be routed toward the final destination 218 as indicated in the packet header. In some embodiments, the UP may route the packet using the first forwarding/steering policy only if the UPF 240 determines not to select the packet or only if the packet is not selected by the UPF 240.

Enhancement for support of application server discovery and additional information elements in AF request will now be discussed. In this enhancement, it is assumed or required that the AF 202 subscribes to notifications of SMF events or UP path management/change events (e.g. DNAI change event) using the AF request described elsewhere herein.

The AF may provide some information elements in the AF request sent to the PCF (e.g. via steps 402, 404, 406, 410 in FIG. 4; or via step 308 in FIG. 3), in addition to those described elsewhere herein, or may provide enhanced information elements in the AF request, i.e. some information elements described above being enhanced.

In the AF request sent to the PCF 206, the AF 202 may include domain name (e.g. in the form of FQDN (Fully Qualified Domain Name)) of the application (or application server), e.g. as part of information to identify the traffic provided in the AF request (i.e. the information to identify the traffic is enhanced to include the domain name of the application or application server) or as a separate information element. In some embodiments, the domain name is associated with the traffic. In some embodiments, the domain name identifies the application or can be used to identify the application.

PCC Rule Generated Based on AF Request, According to the Enhancement.

The PCF 206 includes the domain name of the application, if provided by the AF 202 in the AF request, together with other information such as information on AF subscription to SMF events in the AF request (as described elsewhere herein) in the PCC rules that are generated based on the AF request and sent (e.g. via step 412 in FIG. 4; via step 312 in FIG. 3; or step 232 in FIG. 2B; or via step 806 in FIG. 8) to the SMF 204.

The SMF 204 and UE 102 Behaviour According to the Enhancement.

When a DNAI change event occurs for the PDU Session related to the application, according to the information on AF subscription to SMF events in the PCC rule received from the PCF 206, the SMF 204 sends a notification to the AF 202 about DNAI change (e.g. change from a source DNAI to a target DNAI), e.g. via steps 504 and 506 or step 508 in the case of early notification; via steps 518 and 520 or step 522 in the case of late notification in FIG. 5. The notification includes the target DNAI.

After the AF 202 receives the notification from the SMF 204, it may perform or trigger application relocation, where the application is relocated or migrated from the source DNAI to the target DNAI. The application relocation may cause change in the address of the application or in the address of the application (or application server). The AF may have the knowledge of the new address of the application (or the application server). The address of the application (or application server) may be in the form of IP address.

The AF sends (e.g. steps 510 and 512 or step 514 in the case of early notification; steps 524 and 526 or step 528 in the case of late notification) a positive response to the notification to the SMF 204, confirming the DNAI change or selection (i.e. the target DNAI) indicated in the notification. In the response, the AF 202 may include the new address of the application (or the application server). The AF may further include the domain name (e.g. in the form of FQDN) of the application or application server in the response, for example, in the case that the AF 202 did not provide this information (i.e. the domain name) in the AF request sent to the PCF 206. The AF 202 may further include a UE notification indication in the response, indicating to notify the UE about the address change. The UE notification indication may be optional. After receiving the positive response from the AF 202, the SMF 204 may notify the UE 102 about the new address of the application or application server included in the positive response, as described below with respect to FIG. 7 and with respect to FIG. 9. In some embodiments, the SMF 204 notifies the UE 102 about the new address of the application or application server included in the positive response only if the positive response includes the UE notification indication. The new address of the application or application server is also referred to as target AS IP address in this disclosure.

Figure 7:
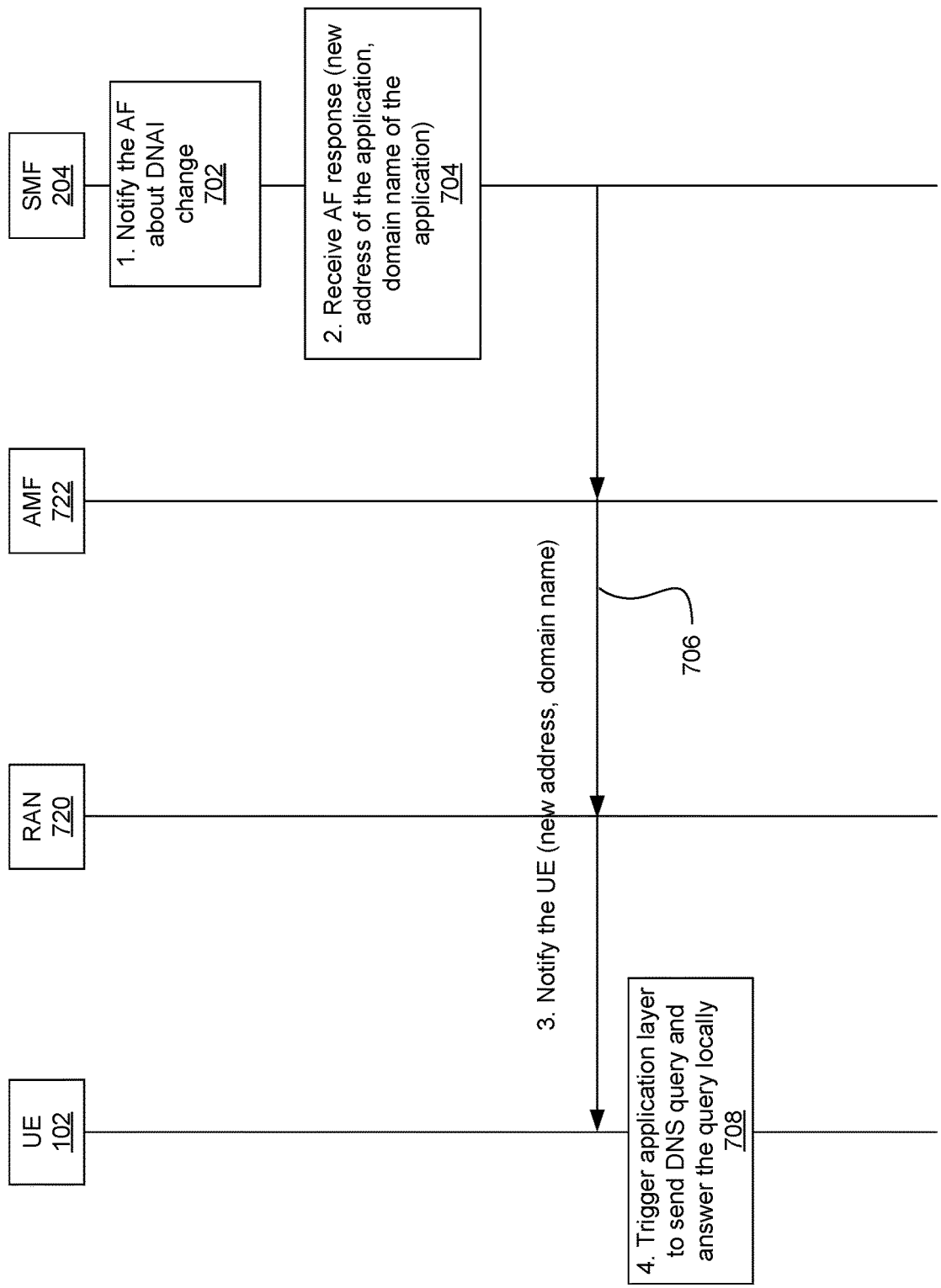
FIG. 7 is a call flow illustration of notifying the UE about new address of the application, according to an embodiment of the present disclosure.

FIG. 7 is a call flow illustration of notifying the UE about new address of the application, according to an embodiment of the disclosure.

After receiving the positive response from the AF 202, step 704 in FIG. 7, the SMF 204 may, according to the UE notification indication in the response and/or local configuration, decide to notify the UE about the address change and sends, as illustrated by step 706 in FIG. 7, a notification to the UE 102. In some embodiments, the SMF 204 may send the notification to the UE even if the response from the AF 202 does not include the indication, e.g. when the SMF's local configuration indicates so.

The SMF 204 sends the notification to the UE via an Access and Mobility Management Function (AMF) 722 and the RAN node 720, as illustrated by step 706 in FIG. 7. The notification may be included in a non-access-stratum (NAS) message to the UE 102.

In the notification sent to the UE 102, the SMF 204 includes the new address of the application (or application server) received from the AF 202. In the notification, the SMF 204 may also include the domain name of the application (or application server), which may be provided by the AF 202 in the response message or obtained from the PCF 206 as part of the PCC rule generated based on the AF request and related to the PDU Session (in this case, the AF 202 provides the domain name in the AF request sent to the PCF 206) or obtained from local configuration corresponding to the application.

After receiving the notification from the SMF 204, the UE 102 obtains the new address, and possibly the domain name of the application (or application server) too, from the notification. The UE may store the information locally. As shown, e.g. by the step 708 in FIG. 7, the UE 102 may trigger the application layer (i.e. the application or OS (Operating System) running on the UE) to (re)send a Domain Name System or Domain Name Service (DNS) query or request for the domain name. When the application layer sends the DNS query or request (via the UE to the DNS server), the UE may locally respond to or answer the query or request using the new address, without sending the DNA query or request to the DNS server.

The procedure of notifying the new address of the application or application server to the UE is illustrated in FIG. 7, in accordance with the above description.

Referring to FIG. 7, in step 702, the SMF 204 sends a notification about the DNAI change to the AF 202 for the PDU Session. This step is similar to the steps 504 and 506 or step 508 in the case of early notification, or to the steps 518 and 520 or step 522 in the case of late notification in FIG. 5.

In step 704, the SMF 204 receives a response (e.g. a positive response) to the notification from the AF 202. The response may include a new address of the application or application server and the domain name of the application or application server. This step is similar to the steps 510 and 512 or step 514 in the case of early notification, or to the steps 524 and 526 or step 528 in the case of late notification.

In step 706, the SMF 204 notifies the UE 102 about the address change by sending a notification (e.g. using an SMF NAS message) to the UE 102 via the AMF 722 and the RAN node 720. The notification may include the new address and the domain name of the application or application server.

In step 708, after receiving the notification from the SMF 204, the UE 102 may trigger the application layer (i.e. the application or OS (Operating System) running on the UE) to (re)send DNS request or query for the domain name. The DNS request or query includes the domain name. The UE 102 may then answer the DNS query or request locally using the new address of the application or application server (received in step 706), which corresponds to the domain name in the DNS request or query. The UE does not send the DNA query or request received from the application layer to the DNS server.

FIG. 8 is a call flow diagram illustration of steering traffic via a network operation administration and maintenance (OAM) system, according to an embodiment of the present disclosure.

It should be noted that although the embodiments/enhancements are discussed with respect to an AF request, the enhancement (i.e. with respect to service function chain, selective traffic steering, application server discovery as discussed above herein) may also be provided via an OAM system 210, as illustrated in FIG. 8, and FIG. 2B.

In step 802, the OAM 210 may provide (e.g. via a message) policy data or configuration information, which may include information contained in the AF request and the enhancement (information relevant for i.e. routing traffic through service function chain, selective traffic steering, application server discovery as discussed herein), to PCF 206. Alternatively, the OAM 210 may populate or update or provide (e.g. via a message) the UDR 420 with the AF request information (the information associated to or contained in the AF request) in step 812, and the UDR 420 notifies the PCF 206, in step 814, about the UDR data changes related to the AF request information. The step 812 may be similar to the step 406 in FIG. 4, with the NEF 208 being replaced with the OAM 210

In step 804, the PCF 206 generates and/or updates the PCC rules according to the policy data or configuration information received from the OAM 210, and provides the PCC rules to the SMF 204 in step 806. As discussed elsewhere herein, the step 806 is similar to or the same as step 232 in FIG. 2B, step 312 in FIG. 3, step 412 in FIG. 4. Alternatively, the OAM may directly provide (e.g. via a message) the policy or configuration information that includes the content of PCC rule or AF request and the enhancements as described herein, to the SMF 204 in step 808.

In step 810, the SMF may configure UPF 240 according to the policy (PCC rules) received from PCF 206 and/or the policy or configuration information received from the OAM 210. As discussed elsewhere herein, this step is similar to or the same as step 234 in FIG. 2B or step 314 in FIG. 3, or step 414 in FIG. 4 or step 602 in FIG. 6.

Discovery of application server (AS) based on AF Influence, according to embodiments, will now be discussed.

A location or potential location of an application is represented by or expressed in the form of a DNAI (Data Network Access Identifier). The DNAI may correspond to a data centre or an edge computing environment.

It should be noted an 'AS corresponding to a DNAI' may be equivalent to or used interchangeably with an 'AS at the location corresponding to a DNAI', which may be equivalent to or used interchangeably with an 'AS at a DNAI'.

One or multiple AS may exist for an application at a location corresponding to a DNAI (or simply, at a DNAI). Accordingly, an AS may have an IP address corresponding to a data network access identifier (DNAI). Embodiments provide support for discovery of AS for an application, and for rediscovery of AS for an application when the previous or existing AS becomes non-optimal or unavailable to a UE. According to embodiments, the AF may subscribe to receive notifications of DNAI change event from the SMF, as described elsewhere herein, e.g. in embodiments associated to FIG. 3, FIG. 4, and FIG. 9. The AF may also provide an 'AF acknowledgement to be expected' indication in the AF subscription to SMF. The indication indicates that the AF will provide a response to the SMF for the notifications.

Figure 9:
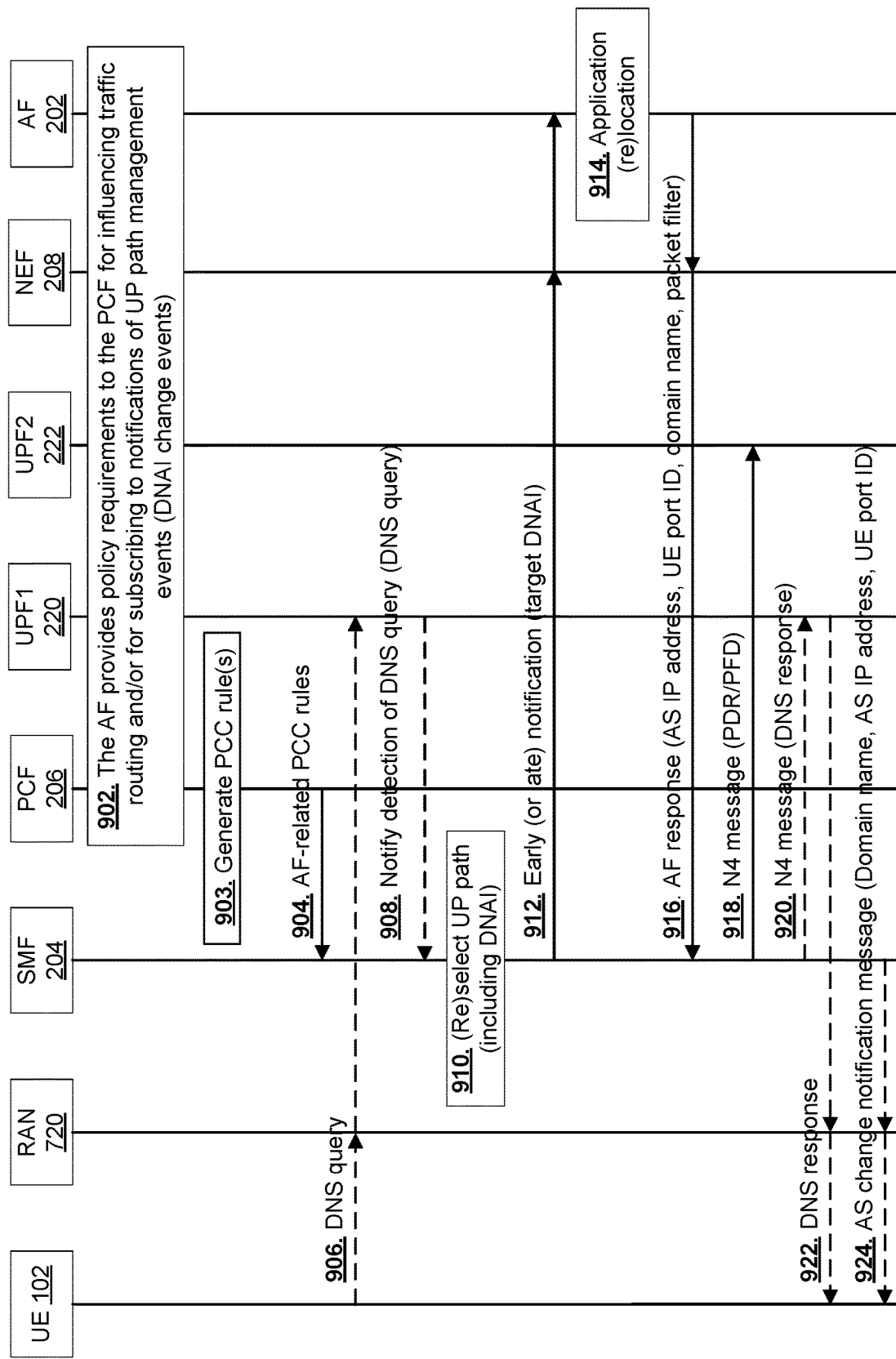
FIG. 9 is an example procedure of application (or application server) discovery after a DNAI change, according to an embodiment.

The AF may provide policy requirements to the 5GC by sending an AF request to the 5GC. The AF request may be sent to the PCF from the AF, as illustrated in FIGS. 3, 4 and 9. In some embodiments, the AF request is sent to the PCF via the NEF, as illustrated in FIG. 3. In embodiments where the AF request is targeting a group of UEs (or any UE) and is thus potentially targeting multiple PCFs, the NEF may store the AF request in the UDR, and the UDR may send the AF request to the PCFs that have subscribed to the UDR for receiving the AF request from the UDR, as illustrated in FIG. 4. The PCF may generate polices (in the form of PCC rules) based on the AF request, e.g. step 310 in FIG. 3 or step 412 in FIG. 4 or step 903 in FIG. 9, and send the policies (i.e. PCC rules) to the SMF (e.g. via step 312 in FIG. 3 or step 412 in FIG. 4 or step 904 in FIG. 9) during a PDU Session establishment procedure or PDU Session modification procedure.

The AF request may be for influencing SMF traffic routing decision on traffic routing (routing of UP traffic toward an application, which handles the UP traffic) and/or for subscription to notifications of UP path management events (DNAI change events) as described elsewhere herein, e.g. in embodiments associated to FIGS. 3, 4, and 9. The mechanism or technique for influencing SMF traffic routing decision on traffic routing and/or for subscription notifications of UP path management events may be referred to as AF influence for short. Embodiments discussed herein provide an enhancement to the AF influence technique, which include the AF influence technique and enhancements thereto.

As described elsewhere herein, e.g. in embodiments associated to FIGS. 3, 4, and 9, the AF request may include: a list of DNAIs representing the potential locations of the application (or application server); information identifying the traffic (such as a packet filter and/or an application ID), which may be generic to or independent from the potential locations of the application; information identifying the UE(es) (such as UE IP address, UE ID, UE group ID); and etc.

According to embodiments, the AF request may further indicate or include a domain name of the application server (AS), which may be in the form of FQDN and may identify the application. According to embodiments, the AF request may further indicate or include an AS port number/ID, which may identify a port at the AS side for the UE to connect to for accessing the application (i.e. sending to and/or receiving data from the AS). According to embodiments, the AF request may further indicate or include a UE port number/ID, which may identify a port at the UE side that the UE may use to connect to the AS (e.g. connect to the AS-side port indicated by the AS port number/ID) for accessing the application. According to embodiments, the AF request may further indicate or include an AS IP address on a per DNAI basis (i.e. an IP address of the AS at the corresponding potential location of the application, in other words, for a DNAI, a corresponding AS IP address). According to embodiments, the AF request may further indicate or include a packet filter on a per DNAI basis, which may include information describing the application traffic related to the corresponding potential location of the application.

The PCF may then generate (e.g. step 310 in FIG. 3 or step 412 in FIG. 4 or step 903 in FIG. 9) PCC rules based on the AF request, including in the PCC rules the information described above. The PCF may then provision (i.e. send or provide) the generated PCC rules to SMF (e.g. via step 312 in FIG. 3 or step 412 in FIG. 4 or step 904 in FIG. 9). The PCC rules are referred to as AF-related PCC rules.

In some embodiments, the domain name of the AS may be mapped from the application ID included in the AF request. As described above and elsewhere herein, the application ID may identify or refer to the application handling the UP traffic and may be used by the UPF to detect the traffic related to the application. In embodiments in which the application ID is included in the AF request, the AF request may not include the domain name of the AS. The mapping from the application ID to the domain name of the AS may be performed according to local configuration (which indicates the domain name corresponding to the application ID) by the PCF (e.g. after the PCF receives the AF request). In some embodiments, the mapping may be performed by the NEF according to local configuration (which indicates the domain name corresponding to the application ID) when the AF request is sent from the AF to the PCF via the NEF. The mapping may be performed by the NEF after the NEF receives the AF request and before the NEF sends the AF request to the PCF or to the UDR. In this case, the AF request sent from the NEF to the PCF or the UDR contains the mapped information (i.e. the domain name).

The provisioning of the AF-related PCC rules (from the PCF to the SMF, e.g. step 312 in FIG. 3 or step 412 in FIG. 4 or step 904 in FIG. 9) may trigger or cause the SMF to perform UP path (re)selection or AS change notification for a PDU Session that is related to or impacted by the AF-related PCC rules, as explained in detail below.

The UP Path (re)selection, according to embodiments, will now be discussed.

In some embodiments, the SMF may (re)select a UP path (including a DNAI) for a PDU Session that is related to or impacted by the AF-related PCC rules, as described in embodiments associated to FIG. 3 and FIG. 4 or embodiments associated to FIG. 9 (step 910). The SMF may (re)select the DNAI from the list of DNAIs included in the AF-related PCC rules. The (re)selected DNAI is referred to as a target DNAI. According to the AF subscription information included/indicated in the AF-related PCC rules, the SMF may notify the AF about a DNAI change, which indicates a DNAI (re)selection, and according to the 'AF acknowledgement to be expected' indication in the AF subscription information, the SMF may wait for a response (referred to as AF response) from the AF, as described in embodiments associated to FIGS. 5, 7, and 9. The notification sent from the SMF to the AF includes the target DNAI (e.g. steps 504 and 506 or step 508 in FIG. 5, or steps 518 and 520 or step 522 in FIG. 5, or step 702 in FIG. 7, or step 912 in FIG. 9). In embodiments in which the DNAI change indicates or is a change from a source DNAI to the target DNAI, the notification may further include the source DNAI. The source DNAI being the DNAI selected by the SMF for the PDU Session before the DNAI reselection indicated in the DNAI change.

After receiving the notification from the SMF (steps 504 and 506 or step 508 in FIG. 5, or steps 518 and 520 or step 522 in FIG. 5, or step 702 in FIG. 7, or step 912 in FIG. 9), the AF may perform application (re)location accordingly. The AF may perform application (re)location by locating the application to (e.g. instantiating and/or activating the application at) the target DNAI (i.e. the corresponding application location) or relocating (or migrating) the application from the source DNAI to the target DNAI, as illustrated in FIG. 9 (step 914). After the application (re)location (i.e. the locating or relocating of the application), the application server corresponding to the target DNAI may be available to serve the UE (the UE's traffic).

When performing the application (re)location, the AF ensures that the AS corresponding to the target DNAI is available for the UE to use, and thus accordingly, the AF may be aware of information about the AS (e.g. the AS IP address, the AS port number/ID) corresponding to the target DNAI. In some embodiments, when performing the application (re)location, the AF may need to transfer the UE context for the application to the application server corresponding to the target DNAI (from the application server corresponding to the source DNAI), and therefore, the AF may be aware of the UE IP address, the UE port number/ID. The AS may also know the UE IP address from the notification received from the SMF (steps 504 and 506 or step 508 in FIG. 5, or steps 518 and 520 or step 522 in FIG. 5, or step 702 in FIG. 7, or step 912 in FIG. 9), if the notification includes the UE IP address.

The AF may send (e.g. after performing the application (re)location) an AF response to the SMF in response to the notification received from the SMF, e.g. as illustrated by steps 510 and 512 or step 514 in FIG. 5, or steps 524 and 526 or step 528 in FIG. 5, or step 704 in FIG. 7, or step 916 in FIG. 9. The AF response may be a positive response and confirm the DNAI change or the DNAI (re)selection indicated in the notification. The AF response (i.e. the positive response) may include N6 traffic routing information related to the target DNAI, which may be used by the SMF to configure/update the N6 traffic routing at a UPF (e.g. a PSA UPF) in the UP path of the PDU Session for routing the application traffic toward the target DNAI. The SMF may configure/update the UPF by providing to the UPF information such as PDR/FAR generated according to the N6 traffic routing information. The UPF may then use the PDR/FAR to route the application traffic toward the target DNAI.

In some embodiments, the AF may further include a packet filter in the AF response sent to the SMF. The packet filter may include information describing the application traffic related to the AS corresponding to the target DNAI. In embodiments in which the AF response includes the packet filter, the SMF may update the packet filter to a UPF (e.g. a PSA UPF) in the UP path of the PDU Session, for example, by sending an N4 message including the PDR/PFD that includes the packet filter or information associated with the packet filter to the UPF. According to the packet filter, the UPF may identify/detect the application traffic and route the application traffic toward the target DNAI. If the AF response does not include the packet filter and if the AF-related PCC rules includes such a packet filter (e.g. the per-DNAI packet filter corresponding to the target DNAI, described above), the SMF may then update the packet filter in the AF-related PCC rules to the UPF.

In some embodiments, in the AF response, the AF may include the domain name (e.g. FQDN) of the AS, a target AS IP address (e.g. an AS IP address corresponding to the target DNAI) and an AS port number/ID. In some embodiments, the AF may further include, in the AF response, a source AS IP address (e.g. an AS IP address corresponding to the source DNAI) and/or a UE port number/ID. The SMF may then obtain the information from the AF response and send the information (all or some) to the UE by sending an AS change notification message (e.g. step 706 in FIG. 7 or step 924 in FIG. 9) to the UE, as described in detail below. In some embodiments, the SMF may send an AS change notification message to the UE only if the AF response includes a UE port number/ID.

The AS change notification, according to embodiments, will now be discussed.

In some embodiments, the AF-related PCC rules include an AS IP address corresponding to the target DNAI (re)selected by the SMF (e.g. (re)selected according to the AF-related PCC rules) as described above. After (re)selecting the target DNAI, the SMF may use the AS IP address in the AF-related PCC rules as a target AS IP address and notify the target AS IP address to the UE using an AS change notification message. In embodiments in which the AF response (i.e. positive response) sent from the AF to the SMF in response to a notification of DNAI change includes a target AS IP address as described above, the SMF may notify the target AS IP address in the AF response to the UE (instead of the AS IP address in the AF-related PCC rules).

The provisioning of the AF-related PCC rules from the PCF to the SMF (as described in embodiments herein, e.g. step 312 in FIG. 3, step 412 in FIG. 4, step 904 in FIG. 9) may update the PCC rules at the SMF, i.e. existing AF-related PCC rules being updated with information in the newly provisioned AF-related PCC rules (or existing AF-related PCC rules being replaced with the newly provisioned the AF-related PCC rules). In some embodiments, the SMF may use the AS IP address corresponding to the (re)selected target DNAI as indicated/included in the newly-provisioned AF-related PCC rules (rather than one in the existing AF-related PCC rules) as the target AS IP address and may notify the UE of the target AS IP address provided the following occurs: the newly provisioned AF-related PCC rules includes an AS IP address that corresponds to a DNAI for the application, the AS IP address in the newly provisioned AF-related PCC rules is different from the one corresponding to the same DNAI for the application in the existing AF-related PCC rules; the SMF has (re)selected (e.g. according to the existing AF-related PCC rules) the DNAI for a PDU Session of a UE in a previous procedure for the UE to access the application before the provisioning of the new AF-related PCC rules; and the SMF decides to continue using the selected DNAI after the provisioning of the AF-related PCC rules.

The SMF may notify the UE of the target AS IP address by sending an AS change notification message to the UE, e.g. step 706 in FIG. 7 or step 924 in FIG. 9. The SMF may obtain the target AS IP from AF-related PCC rules received from the PCF or from an AF response received from the AF, as described above. The AS change notification message may include the target AS IP address. The AS change notification message may indicate or include information (e.g. an indicator) indicating that the message is a notification about AS change or IP address change of the AS. The SMF may include any of the domain name (e.g. FQDN) of the AS, the UE IP address, the UE port number/ID and the AS port number/ID in the AS change notification message sent to the UE. In some embodiments, the SMF may further include the source AS IP address (e.g. an AS IP address corresponding to the source DNAI) in the AS change notification message. The SMF may obtain or identify the domain name of the AS, the UE port number/ID and the AS port number/ID from the AF-related PCC rules and/or from the AF response received. The SMF may obtain or identify the UE IP address and/or the source AS IP address from the local storage (e.g. context of the PDU Session) and/or from the AF response.

The AS change notification message may be sent from the SMF to the UE in the form of a NAS message, e.g. an SMF NAS message, or by being included in a NAS message sent to the UE. In this case, the NAS message is sent from the SMF to the AMF and then forwarded by the AMF to the UE via the RAN node serving the UE. In some embodiments, when sending the NAS message to the AMF, the SMF may send information associated to the NAS message to the AMF, e.g. information identifying the related PDU Session (such as PDU Session ID) and/or information indicating the purpose of the NAS message (such as an indication indicating an AS change or AS IP address change or includes a message notifying AS change or AS IP address change). The AMF may store the associated information locally, e.g. as part of the context of the UE. The AS change notification message may, alternatively, be sent via Short Message Service (SMS). In this case, the SMF may send the AS change notification message to the SMSF (short message service function) serving the UE, and then the SMSF may transfer the AS change notification message to the UE via a short message, e.g. the AS change notification message being included in the short message sent from the SMSF to the UE. The short message may include the AS change notification message or include information included in (or associated with) the AS change notification message.

After notifying the UE of the target AS IP address (via the AS change notification message), the SMF may store the information (e.g. the target AS IP address (and in some embodiments the target AS IP address together with the domain name of the AS) and/or other information, in the AS change notification message), for example, as part of the context of the PDU Session. Thereafter, the SMF may generate a DNS response for a detected DNS query using the stored information, e.g. when the SMF decides not to reselect DNAI upon notification from the UPF about the detection of the DNS query. In some embodiments, the SMF may notify (via an AS change notification) the UE of a target AS IP address corresponding to a domain name for a PDU Session of the UE only if the target AS IP address is different from the one last notified to the UE (as indicated in the locally stored information) for the PDU Session (e.g. as indicated in the local storage or the PDU Session context). The SMF may delete or remove the information from its local storage (or from the PDU Session context stored locally) when or after the PDU Session is released or deactivated.

After receiving the AS change notification message and according to the message, the UE may provide the information in the message (e.g. any of the domain name of the AS and the target AS IP address, the UE port number/ID, the AS port number/ID, the UE IP address, the source AS IP address) to upper layer(s), e.g. the OS (operating system) layer. The upper layer(s), e.g. the OS layer, may use the information received from the UE to perform any of the following: clear/flush the DNS cache (possibly only the cached DNS recorders related to the domain name); update the DNS cache using the domain name of the AS and the target AS IP address; identify the socket(s) corresponding to the UE port number/ID and/or the UE IP address and/or the source AS IP address, and refresh the socket(s) using the target AS IP address and/or the AS port number/ID or connect the socket(s) to the target AS IP address and/or the AS port number/ID; throw or issue or send socket events or exceptions for the socket(s) to the application layer (e.g. application client running on the UE and accessing the AS or the application) to trigger application layer reaction.

In some embodiments, the AS change notification 924, referring to FIG. 9, may include any of the target AS IP address, the UE port number/ID, the AS port number/ID, the UE IP address, and the source AS IP address, but not the domain name of the AS. The UE 102 may then provide the information in the AS change notification 924 to the OS layer. The OS layer may identify the socket corresponding to the UE port number/ID and obtain the domain name corresponding to the socket. The OS layer may then perform any action involving the use of the domain name as described above and elsewhere herein.

The UE may store the information (e.g. the domain name of the AS and the target AS IP address) in the AS change notification message received from the SMF, and locally answer DNS query (related to the domain name) according to the information. The UE may delete or remove the information from its local storage and notify the upper layer(s), e.g. the OS layer, to flush DNS cache (i.e. delete or remove the information from DNS cache) for the domain name after the PDU Session is released or deactivated.

FIG. 9 is an example procedure of application discovery after a DNAI change, according to the embodiments described herein. Referring to FIG. 9, the steps 904, 910, 912, 916, 918, 924 may happen or exist during establishment of a PDU Session or modification of a PDU Session. In the case of PDU Session establishment, the steps 908 and 920 may not happen or exist. In the case of PDU Session modification, the steps 906, 908, 920 and 922 may happen or exist. The UPF1 220 is a UPF, such as a UL CL UPF and/or a PSA UPF (a UPF that acts as PDU Session Anchor (PSA) and connects to the DN via an N6 interface), in the UP path associated to the PDU Session. In some embodiments, the PDU Session is established by the SMF 204 for the UE 102, and the UE 102 may use the PDU Session to access the application.

At step 902, the AF 202 may provide policy requirements to the 5GC by sending an AF request to PCF 206 for influencing the traffic routing and/or for subscribing to notifications of UP path management events (i.e. DNAI change events) as described elsewhere herein, e.g. steps 302-309 in FIG. 3 or steps 402-410 in FIG. 4. The AF request may indicate the application handling the UP traffic, e.g. by an application ID or by a domain name of the AS of the application in the AF request.

At step 904, the PCF 206 may send/provide the AF-related PCC rules to the SMF 204. This step is similar to step 312 in FIG. 3 or step 412 in FIG. 4. The AF-related PCC rules are the PCC rules that are generated by the PCF 206 based on the AF request at step 903, which is similar to or the same as the step 310 in FIG. 3 or the step 410 (the part related to generating policies or PCC rules) in FIG. 4. The AF-related PCC rules may be activated (e.g. by the PCF 206, with respect to the temporal validity condition specified in the AF request) and valid for use.

At step 906, which may be an optional step, the UE 102 may send a DNS query toward a DNS server via RAN node 720. The RAN node 720 may then send the DNS query to UPF1 220. The DNS query is included in a data packet.

At step 908, which may be an optional step, the UPF1 220 may detect that a PDU (i.e. the data packet sent from the UE 102 in step 906) is destined to or targeting the DNS server, e.g. by comparing the destination address in the PDU header (i.e. header of the data packet) with an address of the DNS server and identifying that they are identical. The detection may be based on a PDR and/or a PFD associated to the PDR, which may be preconfigured in the UPF1 220. The UPF1 220 may notify the SMF 204 about the detection by sending a notification to the SMF 204. The notification may include the PDU.

The SMF 204 may check the content (i.e. payload) of the PDU. If the content indicate a DNS query, i.e. a DNS message sent to the DNS server for querying the IP address corresponding to a domain name (which is included in the message and may be in the form of FQDN), and if the domain name matches or is identical to the domain name of the AS in the AF-related PCC rule(s), the SMF 204 may consider that the AF-related PCC rules apply to the PDU Session (or a traffic associated to the PDU Session) and decide to perform the step 910, i.e. to (re)select UP path (including DNAI) for the PDU Session. Otherwise, the SMF 204 may send the PDU back to the UPF1 220 and/or notify/indicate the UPF1 220 to continue to route the PDU (in which case, the UPF1 220 will accordingly send the PDU toward the DNS server), or the SMF 204 may send the PDU to the DNS server.

In some embodiments, the UPF1 220 may check the content (i.e. payload) of the PDU. If the content indicate a DNS query, i.e. a DNS message sent to the DNS server for querying the IP address corresponding to a domain name (which is included in the message and may be in the form of FQDN), and if the domain name matches or is identical to the domain name of the AS in local configuration (e.g. in a locally-store PDR related to the application), the UPF1 220 may notify the SMF 204 about the detection by sending a notification to the SMF 204, as shown in step 908; otherwise, the UPF1 220 may send the PDU to the DNS server. The notification sent from the UPF1 220 to the SMF 204, at step 908, may indicate the detection of traffic related to the application, in which, the notification may not include the DNS message. According to the notification, the SMF 204 may consider that the AF-related PCC rules apply to the PDU Session (or a traffic associated to the PDU Session) and decide to perform step 910, i.e. to (re)select UP path (including DNAI) for the PDU Session.

At step 910, the SMF 204 may (re)select the UP path for the PDU Session according to the AF-related PCC rule(s) received in step 904. The step 910 may include (re)selecting a DNAI for the traffic related to the application, from a list of DNAI(s) that indicate(s) or represent(s) potential locations of the application and are indicated by or included in the AF-related PCC rule(s). The (re)selected DNAI is referred to as target DNAI, as described above. The DNAI (re)selection causes a DNAI change (e.g. from a source DNAI to the target DNAI, or from a status of no DNAI to a status of having a DNAI, i.e. the target DNAI). This step, 910, may be triggered by the step 908, or by other factors (in which case the step 910 may be independent from the step 908).

At step 912, according to an AF subscription indicated (or information about AF subscription) in the AF-related PCC rules, the SMF 204 may notify the AF 202 about the DNAI change, by sending a notification to the AF 202. This step is similar to step 702 in FIG. 7. The AF notification may include the target DNAI (re)selected in the step 910. The AF notification may further include a source DNAI, indicating the DNAI change is a change from the source DNAI to the target DNAI. In some embodiments, the SMF 204 may include the domain name obtained from the AF-related PCC rules received in step 904 in the AF notification; that is, the AF notification includes the domain name received as part of the AF-related PCC rules in step 904. In some embodiments, the notification is an early notification and is sent (e.g. similar to steps 504 and 506 or step 508 in FIG. 5) before the UP path is configured (e.g. similar to step 516 in FIG. 5); in some embodiments, the notification is a late notification and may be sent (e.g. similar to steps 518 and 520 or step 522 in FIG. 5) after the UP path is configured (e.g. similar to step 516 in FIG. 5) or before the UP path is activated. In some embodiments, if the UP path is configured, the UP path must have been activated; in other words, configuring the UP path (e.g. step 516 in FIG. 5) may include activating the UP path. In some embodiments, the notification may be sent from the SMF 204 directly to the AF 202 (e.g. similar to step 508 or step 522 in FIG. 5); in other embodiments, the notification may be sent from the SMF 204 to the AF 202 via the NEF 208 (e.g. similar to steps 504 and 506 in FIG. 5 or steps 518 and 520 in FIG. 5).

At step 914, After receiving the notification from the SMF 204, the AF 202 may perform application (re)location accordingly. The AF 202 may perform application (re)location by locating the application to (e.g. instantiating and/or activating the application at) the target DNAI or relocating (e.g. migrating) the application from the source DNAI to the target DNAI. After the application (re)location, the application server corresponding to the target DNAI may be available to serve the UE 102 (the UE's traffic).

At step 916, the AF 202 may send a response (referred to as an AF response) to the SMF 204 (in response to the notification received in step 912). The step 916 is similar to steps 510 and 512 or step 514 in FIG. 5, or to steps 524 and 526 or step 528 in FIG. 5. The AF response may be a positive response and confirm the DNAI change or DNAI (re)selection indicated in the notification. The AF response may include N6 traffic routing information related to the target DNAI. The AF response may include any of the IP address of the AS corresponding to the target DNAI (which is referred to as target AS IP address) and a UE port number/ID. The UE port number/ID may identify a port at the UE side that the UE may use to connect to the AS. The AF 202 may further include the domain name of the AS and/or the AS port number/ID in the AF response in this step. The AF 202 may identify the target AS (i.e. the AS corresponding to the target DNAI) when performing application (re)location and thus, the AF 202 may obtain or know the target AS IP address. In some embodiments, the AF 202 may query a DNS server to obtain the target AS IP address by providing the domain name to the DNS server. The domain name may be included in the notification 912 received from the SMF 204.

The AF response, at step 916, may further include any of the following: UE IP address, the IP address of the AS corresponding to the source DNAI (which is referred to as source AS IP address), and a packet filter. The packet filter may include information describing traffic (i.e. data packets) of the application after the application relocation step, 914, and is related to the AS corresponding to the target DNAI. For example, the information describing traffic of the application may be in the format of IP 5 tuple, where the destination address is the target AS IP address. In some embodiment, the information describing traffic of the application may be referred to as packet flow description (PFD).

At step 918, if the AF response received in step 916 includes the N6 traffic routing information and/or the packet filter, SMF 204 may send the N6 traffic routing information and/or the packet filter to the UPF2 222 in the UP path. The UPF2 222 may be a UL CL UPF, and/or a PSA that connects to the DN via the target DNAI. The N6 traffic routing information may be included in a FAR sent from the SMF 204 to the UPF2 222. The UPF2 222 will according to the FAR (the N6 traffic routing information) route the data traffic related to the application toward the target DNAI. The packet filter may be included in a PDR sent from the SMF 204 to the UPF2 222. The SMF 204 may alternatively send the packet filter to the UPF2 222 as (or as part of) PFD associated to an application ID. The application ID may be included in a PDR that the UPF2 222 uses to detect the data traffic related to the application. The UPF2 222 may then use the packet filter to detect the application traffic targeting the AS corresponding to the target DNAI and route the application traffic toward the target DNAI.

At step 920, which may be an optional step, the SMF 204 may generate a DNS response to the DNS query 906 detected in the step 908 using information in the AF response received in the step 916 and/or information in the AF-related PCC rules received in step 904. The DNS response may include an IP address of the AS corresponding to the target DNAI (i.e. target AS IP address). If the AF response 916 includes a target AS IP address, the AS IP address in the DNS response may be the target AS IP address in the AF response. Otherwise, the AS IP address in the DNS response is the AS IP address corresponding to the target DNAI included in the AF-related PCC rules. The SMF 204 may send the DNS response to the UPF1 220, and may at the same time instruct/indicate the UPF1 220 to send the DNS response to the UE 102. The UPF1 220 accordingly may send the DNS response to the UE 102 as a response in step 922 to the DNS query 906.

In some embodiments, if neither the AF response 916 nor the AF-related PCC rules 904 includes an AS IP address at or corresponding to the target DNAI, the SMF 204 may send the DNS query back to the UPF1 220 and/or may instruct/indicate the UPF1 220 to route the DNS query as usual, i.e. to send the DNS query to the DNS server. The UPF1 220 accordingly may send the DNS query 906 to the DNS server.

It should be noted that in some embodiments, the UPF1 220 and UPF2 222 may be the same entity. When UPF1 220 and UPF2 222 are the same entity, steps 918 and 920 may be integrated into a single step.

At step 924, if either the AF-related PCC rules received in 904 or the AF response received in step 916 includes an AS IP address at or corresponding to the target DNAI, the SMF 204 may send an AS change notification message to the UE 102, as described above. The AS change notification message includes the AS IP address as target AS IP address and may indicate that the IP address of the AS has changed or that the AS has changed.

The AS change notification message may include information included in/associated with the AF response received from the AF 202 in the step 916 and/or information included in/associated with the AF-related PCC rules received from the PCF 206 in the step 904. The AS change notification message may include the domain name of the application or application server and/or the target AS IP address and/or the AS port number/ID, which may be obtained or retrieved or derived from the AF response or from the AF-related PCC rules. In some embodiments, if the AF response includes an AS IP address corresponding to the target DNAI, the target AS IP address in the AS change notification message is the AS IP address in the AF response. Otherwise, the target AS IP address in the AS change notification message is the AS IP address at or corresponding to the target DNAI, which is included in the AF-related PCC rules.

The AS change notification message may include the source AS IP address, the UE port number/ID, which may be obtained or retrieved or derived from the AF response. The AS change notification message may further include the UE IP address related to the application, e.g. the IP address that the UE may use to send the DNS message detected by the UPF1 220 in step 908, or the IP address that the UE may use to access the application. The UE IP address may be obtained or retrieved from the AF response. The AS change notification message may be sent to the UE 102 in the form of a NAS message or via SMS as described elsewhere herein. The step 924 may be optional, e.g. when step 920 takes place.

The UE 102 may then trigger the upper layer(s), e.g. OS layer, to react or respond to the IP address (or application server) change indicated in the AS change notification message received in the step 924, e.g. by providing the information in the message to the upper layer(s). In accordance to the information received from the UE 102, the upper layer(s) may perform further actions as described elsewhere herein.

In some embodiments, the steps 910 to 918 may be optional. For example, when the SMF 204 decides not to perform step 910 after receiving the notification from the UPF1 220 in step 908. The SMF 204 may decide not to perform step 910 because the current UP path (which include the current DNAI) of the PDU Session is already optimal or suitable for the application traffic. In this case, the SMF 204 may generate a DNS response to the DNS query 906 using information, e.g. the AS IP address corresponding to the current DNAI, in the AF-related PCC rules received in step 904 or in local storage (e.g. the information is obtained from last AF response received from the AF in a previous procedure and stored locally). The SMF 204 may send the DNS response to the UPF1 220 in step 920.

In some embodiments, the steps 906 to 922 are optional. For example, when the provisioning of the AF-related PCCs rule from PCF 206 to SMF 204, in step 904, updates existing AF-related PCC rules at SMF 204, the SMF 204 may perform step 924 by sending an AS change notification message to the UE 102 as described elsewhere herein. The AS change notification message may include the change in AS IP address corresponding to an existing DNAI. As such, the SMF may perform step 924 due to the change of AS IP address corresponding to the current DNAI.

In some embodiments, the AF 202 may notify the PCF 206 about an AS change (change of AS from a source AS to a target AS) for traffic of a UE 102 by sending a notification to the PCF 206. The AS change may happen within a DNAI (i.e. not involving a DNAI change), or in other words, the AS change may not be associated with a DNAI change. The AF notification may be sent to the PCF 206 via the NEF 208 or directly to PCF 206 (without using the NEF), e.g. in the form of policy requirement. The AF notification is similar to the steps 302-309 in FIG. 3 or steps 402-410 in FIG. 4 or step 902 in FIG. 9. The AF notification may include one or more of the domain name of the AS, the IP address of the target AS (i.e. target AS IP address), or a UE IP address that the traffic (which is routed to the AS) is related to. The AF notification may further include the DNAI where the target AS is located. After receiving the notification from the AF 202, the PCF 206 may then notify the UE 102 about the AS change through a UCU (UE Configuration Update) procedure. In the UCU procedure, the PCF 206 may send, via the AMF 722, to the UE 102 one or more of the domain name of the AS, the target AS IP address, the DNAI and the UE IP address. In some embodiments, the notification sent from the AF 202 to the PCF 206 may include a packet filter describing the traffic related to the target AS. In this case, the PCF 206 may provide the packet filter to the SMF 204 by including the packet filter in a PCC rule that is generated (similar to step 903 in FIG. 9) based on the AF notification, and the PCF 206 may then send the PCC rule including the packet filter to the SMF 204 (e.g. similar to step 904 in FIG. 9). The SMF 204 may then provide the packet filter to a UPF 240 such as the PSA UPF of the corresponding PDU Session (e.g. similar to step 918 in FIG. 9). The PCF 206 may select or identify the SMF 204 using the UE IP address in the notification received from the AF 202.

In some embodiments, the AF 202 may notify the SMF 204 about an AS change for traffic of a UE 102 by sending a notification to the SMF 204. Although the notification sent by the AF 202 is similar to the AF response (e.g. step 916 in FIG. 9), the notification may not be in response to a DNAI change notification, (e.g. step 912 in FIG. 9). The AF notification may contain the same or similar information as the AF response in step 916 of FIG. 9.

The AF notification may be sent to the SMF 204 via the NEF 208 or directly to SMF 204 (without using the NEF 208). In embodiments in which the AF notification is sent via the NEF 208, the notification may include one or more of the domain name of the AS, the IP address of the AS, or a UE IP address that the traffic is related to. The AF notification may further include the DNAI. Before sending the notification to the SMF 204, the NEF 208 or the AF 202 (in the case that the notification is sent directly to the SMF 204) may identify or select the SMF 204 using the UDM 248. To identify/select the SMF 204 using the UDM 248, the NEF 208/AF 202 may send the UE IP address to the UDM 248 and receive from the UDM 248 information related to the SMF 204. The identified/selected SMF 204 is the SMF serving the PDU Session of the UE 102, the UE 102 having been allocated with the UE IP address. The information related to the SMF 204 received from the UDM 248 may include an ID or an IP address of the SMF 204. The AF 202/NEF 208 may send the notification to the SMF 204 according to the ID or IP address of SMF 204 received from the UDM 248.

After receiving the notification from the AF 202, the SMF 204 may notify the UE 102 about the AS change by sending an AS change notification to the UE 102 as described above (e.g. step 924 in FIG. 9). In some embodiments, the notification sent from the AF 202 to the SMF 204 may include a packet filter describing the traffic related to the target AS. In this case, the SMF 204 may provide the packet filter to a UPF 240 such as PSA UPF of the corresponding PDU Session (e.g. similar to step 918 in FIG. 9). In some embodiments, step 910 may be performed in response to step 908, in which the SMF 204 may include the DNS query received in step 908 in the notification sent to AF 202 in step 912. In this case, the AF 202 may include a DNS response for the DNS query in the AF response sent to SMF 204 in step 916. The SMF 204 may obtain the DNS response from the AF response and sends it to the UPF 220 via step 920. The UPF 220 may then send the DNS response to the UE 102 in step 922 through the user plane as a response to the DNS query received in step 906.

In some embodiments, step 910 may be performed in response to step 908, in which the AF response 916 may not include a target AS IP address. Accordingly, the SMF 204 may send the DNS query received in step 908 to a DNS server, e.g. the DNS server corresponding to the DNAI selected in step 910. The DNS server may send a DNS response to SMF 204, answering and/or responding to the DNS query. The interactions between SMF 204 and the DNS server, which are not shown in FIG. 9, may occur after the SMF 204 receives the AF response 916. After receiving the DNS response from the DNS server, the SMF 204 may send the received DNS response to UPF 220 via step 920, in which, UPF 220 may then forward the DNS response to UE 102 via step 922.

In some embodiments, step 910 may not be performed in response to step 908, and the AF response in step 916 may not include a UE port number/ID. In such embodiments, the SMF 204 may send an AS change notification (or AS change notification message) to the UE 102 via step 924. The AS change notification (or AS change notification message) may include the domain name (received in step 904 or in step 916) and the target AS IP address received in the the AF response in step 916. The AS change notification may not include a UE port number/ID. After receiving the AS change notification from SMF 204 in step 924, the UE 102 may provide the information in the AS change notification to the OS layer. The OS layer may then delete the DNS record related to the domain name (or even flush/clear the DNS cache) and/or update the DNS cache using the information received from the UE 102 (i.e. the domain name and the target AS IP address).

In some embodiments, step 910 may not be performed in response to step 908, and the AF response 916 may not include a target AS IP address. In such embodiments, the SMF 204 may send an AS change notification (or AS change notification message) to the UE 102 via step 924. The AS change notification may include a domain name (i.e. the domain name received as part of the AF-related PCC rules in step 904). The AS change notification may not include a target AS IP address. However, the AS change notification (or AS change notification message) may indicate an AS change related to the domain name. After receiving the AS change notification, the UE 102 may notify the OS layer to: flush or clear the DNS cache for the domain name, or delete the cached DNS record related to the domain name.

An aspect of the disclosure provides for a method for steering traffic of at least one protocol data unit (PDU), by a session management function (SMF). The method includes receiving information from one of a policy control function (PCF) and an operations, administration and maintenance or management (OAM) system. The information received includes service function chain information indicating that the at least one PDU should be routed through a service function chain comprising at least one Data Processing Function (DPF), in a particular order. The method further includes configuring at least one user plane function (UPF) according to the information. In some embodiments, the step of configuring at least one user plane function (UPF) according to the information includes instructing a UPF to receive the at least one PDU from a user plane entity. In some embodiments the user plane entity includes a UPF, a RAN node, or a DTF. In some embodiments, the step of configuring at least one UPF according to the information further includes instructing the UPF to send the at least one PDU to a first DPF of the service function chain. In some embodiments, the method further includes receiving a policy request from a network function relating to path management based on an AF request. In some embodiments the method further includes selecting or reselecting a user plane path according to the policy request. In some embodiments, the reselecting a user plane path includes configuring a second UPF to receive the at least one PDU from a user plane entity. In some embodiments, the reselecting a user plane path further includes instructing the second UPF to send the at least one PDU to a second DPF of the service function chain. In some embodiments the second DPF is the same as the first DPF. In some embodiments the second DPF is different from the first DPF. In some embodiments, the method further comprises sending an early notification to the AF. In some embodiments, the method further includes sending a late notification to the AF. In some embodiments, the early notification includes DNAI information. In some embodiments, the late notification includes the DNAI information.

An aspect of the disclosure provides a method of discovering an application server (AS) for an application serving a user equipment (UE), by a session management function (SMF). The method includes receiving, from an application function (AF), a message including a target AS internet protocol (IP) address corresponding to a target data network access identifier (DNAI). The method further includes sending, to the UE, an AS change notification message including the target AS IP address. In some embodiments, prior to the step of receiving, the method further includes receiving, from a policy control function (PCF), a policy and charging control (PCC) rule based on an AF request to influence application traffic. In some embodiments, prior to the step of receiving, the method further includes receiving, from a policy control function (PCF), a policy and charging control (PCC) rule based on an AF request to influence application traffic. In some embodiments, the message received form the AF further includes a UE port identifier (ID), and the AS change notification message further includes the UE port ID. In some embodiments, the PCC rule further includes a UE port identifier (ID), and the AS change notification message further includes the UE port ID. In some embodiments, the message received from the AF further includes a packet filter describing application traffic related to the AS corresponding to the target DNAI, and the method further includes after the step of receiving the message from the AF, sending, to a user plane function (UPF), an N4 message including the packet filter. In some embodiments, the PCC rule further includes a packet filter describing application traffic related to the AS corresponding to the target DNAI, and the method further includes sending, to a user plane function (UPF), an N4 message including the packet filter. In some embodiments, the packet filter is sent to the UPF as part of a packet detection rule (PDR). In some embodiments, the packet filter is sent to the UPF as part of a packet flow description (PFD) associated to an application ID, the application ID being included in a PDR used by the UPF to detect the application traffic. In some embodiments, the method further including selecting the target DNAI from a list of DNAIs included in the PCC rule. In some embodiments, the method further includes sending, to the AF, according to an AF subscription in the PCC rule, a notification message including the target DNAI. In some embodiments, prior to step of selecting the target DNAI, the method further includes receiving, from a user plane function (UPF), a notification message indicating a protocol data unit (PDU) targeting a domain name system (DNS) server, the message including the PDU. In some embodiments, the notification message to the AF further includes a source DNAI. In some embodiments, the AS change notification message further includes a source AS IP address, the source AS IP address is received from one of: the message received from the AF or local storage. In some embodiments, the AS change notification message to the UE is a non-access-stratum (NAS) message. In some embodiments, the NAS message is sent to the UE via an access and mobility management function (AMF) and a radio access network (RAN) node. In some embodiments, the AS change notification message to the UE is included in a short message. In some embodiments, the short message is sent to the UE via a short message service function (SMSF) serving the UE. In some embodiments, the method further includes sending an N4 message to the UPF including the target AS IP address. In some embodiments, the N4 message further includes instructions for the UPF to send a DNS response to the UE. In some embodiments, the method further includes generating a DNS response including the target AS IP address. In some embodiments, the method further includes sending the UPF the DNS response. In some embodiments, the AF request is received from a network exposure function.

Another aspect of the disclosure provides for a method of discovering an application server (AS) for an application serving a user equipment (UE), by a session management function (SMF). The method includes receiving, from a policy control function (PCF), a policy and charging control (PCC) rule based on an application function (AF) request to influence application traffic related to the AS, the PCC rule including a target AS internet protocol (IP) address corresponding to a target data network access identifier (DNAI). The method further includes sending, to the UE, an AS change notification message including the target AS IP address. In some embodiments, the method further includes selecting the target DNAI from a list of DNAIs included in the PCC rule. In some embodiments, the method further includes sending, to the AF, according to an AF subscription in the PCC rule, a notification message including the target DNAI. In some embodiments, prior to step of selecting the target DNAI, the method further includes receiving, from a user plane function (UPF), a notification message indicating a protocol data unit (PDU) targeting a domain name system (DNS) server, the message including the PDU. In some embodiments, the method further includes sending an N4 message to the UPF including the target AS IP address. In some embodiments, the N4 message further includes instructions for the UPF to send a DNS response to the UE. In some embodiments, the method further includes generating a DNS response including the target AS IP address. In some embodiments, the method further includes sending the UPF the DNS response.

Another aspect of the disclosure provides for a method of discovering an application server (AS) for an application serving a user equipment (UE), by a (PCF). The method includes receiving, from an application function (AF), a message including a target AS internet protocol (IP) address corresponding to a target data network access identifier (DNAI). The method further includes sending, to the UE, a notification message including the target AS IP address. In some embodiments, the message from the AF further includes the DNAI. In some embodiments, the message from the AF is received via a network exposure function. In some embodiments, the notification message is sent to the UE via an access and mobility management function.

Another aspect of the disclosure provides for a network node. The network node includes a processor and a non-transient storage medium for storing instructions which when executed by the at least one processor cause the network node to execute the methods described here. For example, such a network node is caused to receive, from an application function (AF), a message including a target application server (AS) internet protocol (IP) address corresponding to a target data network access identifier (DNAI). The network node is further caused to send, to a user equipment (UE), an AS change notification message including the target AS IP address.

Another aspect of the disclosure provides for a network node. The network node includes a processor and a non-transient storage medium for storing instructions which when executed by the at least one processor cause the network node to execute the methods described here. For example, such a network node is caused to receive, from a policy control function (PCF), a policy and charging control (PCC) rule based on an application function (AF) request to influence application traffic related to the application server (AS), the PCC rule including a target AS internet protocol (IP) address corresponding to a target data network access identifier (DNAI). The network node is further caused to send, to a user equipment (UE), an AS change notification message including the target AS IP address.

Another aspect of the disclosure provides for a network node. The network node includes a processor and a non-transient storage medium for storing instructions which when executed by the at least one processor cause the network node to execute the methods described here. For example, such a network node is caused to receive, from an application function (AF), a message including a target application server (AS) internet protocol (IP) address corresponding to a target data network access identifier (DNAI). The network node is caused to send, to a user equipment (UE), a notification message including the target AS IP address.

In this disclosure, when a first function provides information to second function, the first function may send a message to the second function, the message including the information. Further, it can be understood that, in the embodiments of the present invention, a function can configure some information in/into a different function by sending the information to the different function so that the different function can take actions using the received information.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A method, comprising:
    sending, by an application function (AF), an AF request to a policy control function (PCF), the AF request including information indicating that traffic is to be routed through a service function chain, the service function chain including one or more functions arranged in an order;
    generating, by the PCF, one or more policy and charging control (PCC) rules based on the AF request;
    sending, by the PCF, the one or more PCC rules to a session management function (SMF); and
    enforcing, by the SMF, the one or more PCC rules on a protocol data unit (PDU) Session that is used to route the traffic and is served by the SMF.

2. The method according to claim 1, wherein the AF request further includes information indicating that the traffic is to be routed to a final destination after being routed through the service function chain.

3. The method according to claim 2, wherein the one or more PCC rules include the information indicating that the traffic is to be routed through the service function chain.

4. The method according to claim 3, wherein the enforcing, by the SMF, the one or more PCC rules on the PDU Session comprises:
- selecting, by the SMF, a location for each function of the one or more functions included in the service function chain and at least one user plane function (UPF) for the PDU Session; and
- configuring, by the SMF, the at least one UPF to route the traffic through the location for each function of the one or more functions included in the service function chain in the order of the respective functions in the service function chain.

5. The method according to claim 4, wherein the configuring, by the SMF, the at least one UPF to route the traffic comprises:
- generating or constructing, by the SMF, at least one of: one or more packet detection rules (PDRs) and one or more forwarding action rules (FARs) according to the information in the one or more PCC rules; and
- sending, by the SMF, the at least one of: the one or more PDRs and the one or more FARs to the at least one UPF.

6. The method according to claim 5, wherein the AF request further includes information on selective traffic steering that indicates that packets of the traffic should be selectively steered or routed to the service function chain, the method further comprising:
- configuring, by the SMF, the at least one UPF to perform the selective traffic steering for the traffic in accordance with the information on the selective traffic steering.

7. The method according to claim 4, wherein;
- the service function chain includes a first function, a last function, and a data processing function (DPF), and
- the at least one UPF comprises a first UPF and a second UPF,
- the method further comprising, when the last function in the service chain is not the DPF or when the one or more PCC rules indicate that the traffic is to be routed to the final destination:
  - configuring, by the SMF, the first UPF to route the traffic to the DPF, and
  - configuring the second UPF to receive the traffic back from the DPF.

8. The method according to claim 7, further comprising:
- obtaining, by the first function, information about how to route, send or forward the traffic as uplink (UL) traffic to the second UPF through the AF from the SMF.

9. The method according to claim 6, wherein the generating or constructing, by the SMF, the at least one of the one or more PDRs and the one or more FARs generates or constructs at least one PDR and multiple FARs, the method further comprising:
- including, by the SMF, information about traffic selection in the at least one PDR and linking the at least one PDR to the multiple FARs, the information about the traffic selection being identical or related to the information on the selective traffic steering.

10. The method according to claim 9, wherein the at least one PDR includes one or more attributes of: a FAR identifier (ID) identifying a forwarding action that is to be taken in support of the selective traffic steering and a PDU selection strategy for the traffic selection.

11. The method according to claim 10, wherein for a packet of the packets of the traffic that matches or satisfies the at least one PDR, performing, by the at least one UPF, the selective traffic steering under the following condition:
- the at least one PDR indicates that the packet is received or coming from a radio access network or a core network;
- the at least one PDR is associated or linked to a first FAR of the one or more FARs and to a second FAR of the one or more FARs, the first FAR to be used to route the traffic toward the final destination rather than the service function chain and the second FAR to be used to route the traffic toward the service function chain;
- the PDR includes the information about the traffic selection; and
- the at least one UPF determines whether to select the packet based on the information about the traffic selection.

12. The method according to claim 9, wherein the FAR includes an attribute of a PDU selection strategy for the traffic selection.

13. The method according to claim 12, further comprising:
- determining, by the at least one UPF, whether to select a packet of the packets of the traffic based on the PDU selection strategy for the traffic selection in the FAR.

14. A system, comprising:
- at least one processor;
- at least one memory storing instructions, which when executed by the at least one processor, implement an application function (AF), a policy control function (PCF) and a session management function (SMF);

wherein:
- the AF is configured to:
  - send an AF request to the PCF, the AF request including information indicating that traffic is to be routed through a service function chain, the service function chain including one or more of functions arranged in an order;
- the PCF is configured to:
  - generate one or more policy and charging control (PCC) rules based on the AF request; and
  - send one or more PCC rules to the SMF; and
- the SMF is configured to:
  - enforce the one or more PCC rules on a protocol data unit (PDU) Session that is used to route the traffic and is served by the SMF.

15. The system according to claim 14, wherein the AF request further includes information indicating that the traffic is to be routed to a final destination after being routed through the service function chain.

16. The system according to claim 15, wherein the one or more PCC rules include the information indicating that the traffic is to be routed through the service function chain.

17. The system according to claim 16, wherein the SMF is configured to enforce the one or more PCC rules on the PDU Session by:
- selecting a location for each function of the one or more functions included in the service function chain and at least one user plane function (UPF) for the PDU Session; and
- configuring the at least one UPF to route the traffic through the location for each function of the one or more functions included in the service function chain in the order of the respective functions in the service function chain.

18. The system according to claim 17, wherein the SMF is configured to configure the at least one UPF to route the traffic by:

generating or constructing at least one of: one or more packet detection rules (PDRs) and one or more forwarding action rules (FARs) according to the information in the one or more PCC rules; and sending the at least one of: the one or more PDRs and the one or more FARs to the at least one UPF.

19. The system according to claim 18, wherein the AF request further includes information on selective traffic steering that indicates that packets of the traffic should be selectively steered or routed to the service function chain, the SMF being further configured to:

configure the at least one UPF to perform the selective traffic steering for the traffic in accordance with the information on the selective traffic steering.

20. The system according to claim 17, wherein:
the service function chain includes a first function, a last function, and a data processing function (DPF),
the at least one UPF comprises a first UPF and a second UPF, and
when the last function in the service chain is not the DPF or when the one or more PCC rules indicate that the traffic is to be routed to the final destination, the SMF is configured to configure the first UPF to route the traffic to the DPF and configure the second UPF to receive the traffic back from the DPF.

21. The system according to claim 20, wherein the first function is configured to:
obtain information about how to route, send or forward the traffic as uplink (UL) traffic to the second UPF through the AF from the SMF.

22. The system according to claim 19, wherein the generating or constructing the at least one of: the one or more PDRs and the one or more FARs generates or constructs at least one PDR and multiple FARS, the at least one PDR:
including information about traffic selection, and linking the at least one PDR to the multiple FARs, the information about traffic selection being identical or related to the information on the selective traffic steering.

23. The system according to claim 22, wherein the at least one PDR includes one or more attributes of: a FAR identifier (ID) identifying a forwarding action rule for a forwarding action to be taken in support of the selective traffic steering and a PDU selection strategy for traffic selection.

24. The system according to claim 23, wherein for a packet of the packets of the traffic that matches or satisfies the at least one PDR, the at least one UPF is configured to:
perform the selective traffic steering under the following conditions:
the at least one PDR indicates that the packet is received or coming from a radio access network (RAN) or a core network;
the at least one PDR is associated or linked to a first FAR of the one or more FARs and to a second FAR of the one or more FARs, the first FAR to be used to route traffic toward the final destination rather than the service function chain and the second FAR to be used to route traffic toward the service function chain; and
the at least one PDR includes information about the traffic selection;
and
determine whether to select the packet of the packets of the traffic based on the information about the traffic selection.

25. The system according to claim 22, wherein the multiple FARs include an attribute of: a PDU selection strategy for the traffic selection.

26. The system according to claim 25, wherein the at least one UPF is further configured to:
determine whether to select a packet of the packets of the traffic based on the PDU selection strategy for the traffic selection in the FAR.

27. A method, comprising:
receiving, by a session management function (SMF), one or more policy and charging control (PCC) rules from a policy control function (PCF), the one or more PCC rules including information indicating that traffic is to be routed through a service function chain, the service function chain including one or more functions arranged in an order;
enforcing, by the SMF, the one or more PCC rules on a protocol data unit (PDU) Session that is used to route the traffic and is served by the SMF, the enforcing comprising:
selecting, by the SMF, a location for each function of the one or more functions located in the service function chain and at least one user plane function (UPF) for the PDU Session, the at least one UPF including a first UPF and a second UPF; and
configuring, by the SMF, the at least one UPF to route the traffic through the location for each function of the one or more functions included in the service chain in the order of the respective functions in the service function chain, the service function chain including a first function, a last function, and a data processing function (DPF),
the method further comprising, when the last function in the service chain is not the DPF or when the one or more PCC rules indicate that the traffic is to be routed to a final destination;
configuring, by the SMF, the first UPF to route the traffic to the DPF; and
configuring the second UPF to receive the traffic back from the DPF.

28. The method according to claim 27, wherein the configuring, by the SMF, the at least one UPF to route the traffic through the location for each function of the one or more functions included in the service chain in the order of the respective functions in the service function chain comprises:
generating or constructing, by the SMF, at least one of: one or more packet detection rules (PDRs) and one or more forwarding action rules (FARs) according to the information in the one or more PCC rules; and
sending, by the SMF, the at least one of the one or more PDRs and the one or more FARs to the at least one UPF.

29. The method according to claim 27, wherein the one or more PCC rules further include information on selective traffic steering that indicates that packets of the traffic are to be selectively steered or routed to the service function chain, the method further comprising:
configuring, by the SMF, the at least one UPF to perform the selective traffic steering for the traffic in accordance with the information on the selective traffic steering.

30. The method according to claim 29, wherein the generating or constructing, by the SMF, the at least one of: the one or more PDRs and the one or more FARs generates or constructs at least one PDR and multiple FARs, the method further comprising:
including, by the SMF, information about traffic selection in the at least one PDR and linking the at least one PDR to the multiple FARs, the information about traffic selection being identical or related to the information on selective traffic steering.

31. A session management function (SMF), comprising:
at least one processor;
at least one memory storing instructions, which when executed by the at least one processor, implement the SMF to:
receive one or more policy and charging (PCC) rules from a policy control function (PCF), the one or more PCC rules including information indicating that traffic is to be routed through a service function chain, the service function chain including one or more functions arranged in an order; and
enforce the one or more PCC rules on a protocol data unit (PDU) Session that is used to route the traffic and is served by the SMF by:
selecting a location for each function of the one or more functions located in the service function chain and at least one user plane function (UPF) for the PDU Session, the at least one UPF including a first UPF and a second UPF; and
configuring the at least one UPF to route the traffic through the location for each function of the one or more functions included in the service chain in the order of the respective functions in the service function chain, the service function chain including a first function, a last function, and a data processing function;
and
when the last function in the service chain is not the DPF or when the one or more PCC rules indicate that the traffic is to be routed to a final destination, the instructions, when executed by the at least one processor, implement the SMF to:
configure the first UPF to route the traffic to the DPF, and
configure the second UPF to receive the traffic back from the DPF.

32. The SMF according to claim 31, wherein when the instructions are executed by the at least one processor, the at least one processor implements the SME to configure the first UPF to route the traffic to the first function by:
generating or constructing at least one of: one or more packet detection rules (PDRs) and one or more forwarding action rules (FARs) according to the information in the one or more PCC rules; and
send the at least one of the one or more PDRs and the one or more FARs to the at least one UPF.

33. The SMF according to claim 31, wherein:
the one or more PCC rules further include information on selective traffic steering that indicates that packets of the traffic are to be selectively steered or routed to the service function chain, and
the SMF configures the at least one UPF to perform the selective traffic steering for the traffic in accordance with the information on the selective traffic steering.

34. The SMF according to claim 33, wherein the generating or constructing the at least one of: the one or more PDRs and the one or more FARs generates or constructs at least one PDR and multiple FARs, the SMF being configured to:
include information about the traffic selection in the at least one PDR and link the at least one PDR to the multiple FARs, the information about traffic selection being identical or related to the information on selective traffic steering.

* * * * *